US012220795B2

(12) United States Patent
Anderson

(10) Patent No.: US 12,220,795 B2
(45) Date of Patent: Feb. 11, 2025

(54) CENTERLINE CLAMP ASSEMBLY AND ASSOCIATED SYSTEMS AND METHODS

(71) Applicant: Fermi Research Alliance, LLC, Batavia, IL (US)

(72) Inventor: Kris A. Anderson, Lockport, IL (US)

(73) Assignee: Fermi Research Alliance, LLC, Batavia, IL (US)

( * ) Notice: Subject to any disclaimer, the term of this patent is extended or adjusted under 35 U.S.C. 154(b) by 181 days.

(21) Appl. No.: 17/390,231

(22) Filed: Jul. 30, 2021

(65) Prior Publication Data

US 2022/0055188 A1 Feb. 24, 2022

Related U.S. Application Data

(60) Provisional application No. 63/068,087, filed on Aug. 20, 2020.

(51) Int. Cl.
*B25B 5/12* (2006.01)

(52) U.S. Cl.
CPC .................................... *B25B 5/12* (2013.01)

(58) Field of Classification Search
CPC ....................................................... B25B 5/12
See application file for complete search history.

(56) References Cited

U.S. PATENT DOCUMENTS

| | | | | |
|---|---|---|---|---|
| 725,874 | A | 4/1903 | Riley | |
| 2,323,039 | A | 6/1943 | Hill | |
| 2,615,413 | A | 10/1952 | Adams et al. | |
| 3,243,879 | A | 4/1966 | Gill et al. | |
| 3,330,021 | A | 7/1967 | Jacobsen | |
| 3,601,387 | A | 8/1971 | Pavlich | |
| 5,076,025 | A | 12/1991 | Reeble | |
| 5,327,765 | A * | 7/1994 | Weykamp | B21D 9/01 269/48.1 |
| 6,464,127 | B2 | 10/2002 | Litwinski et al. | |

* cited by examiner

*Primary Examiner* — Nirvana Deonauth
(74) *Attorney, Agent, or Firm* — William A. Harding; Grable Martin PLLC

(57) ABSTRACT

A centerline clamp assembly sized to insert into an end aperture of a pipe structure, characterized by two or more symmetrically-formed linkages interoperably connected in series, with each of these linkages comprising respective opposing toggle joints pivotally joined at their inner ends to a shared common linkage assembly and at their outer ends by a respective first linkage assembly and a second linkage assembly, with each linkage assembly defining a respective bore configured to concurrently receive an actuating shaft in position along a common geometric centerline axis of the pipe. Multiple alternative configurations may be used in which the number of linkages and linkage assemblies may be increased to achieve clamping action at multiple locations in a pipe structure, thus varying the clamping force according to the properties of the pipe. The configuration and number of linkage assemblies may serve as mounting platforms for instruments, tools, and/or accessories.

20 Claims, 17 Drawing Sheets

CENTERLINE CLAMP ASSEMBLY AND ASSOCIATED SYSTEMS AND METHODS

RELATED APPLICATION

The present application claims the benefit of U.S. Provisional Patent Application Ser. No. 63/068,087 filed Aug. 20, 2020 and entitled "Centerline Clamp Assembly and Associated Systems and Methods," which is incorporated herein by reference in its entirety.

STATEMENT REGARDING FEDERALLY SPONSORED RESEARCH OR DEVELOPMENT

The invention described in this patent application was made with Government support under the Fermi Research Alliance, LLC, Contract Number DE-AC02-07CH11359 awarded by the U.S. Department of Energy. The Government has certain rights in the invention.

FIELD OF THE INVENTION

The present invention relates generally to pipe holding clamp technology and, more particularly, to collapsible interior-fitting holding clamps for fixedly engaging substantially cylindrical structures to facilitate their installation, measurement, evaluation, repair, and/or maintenance.

BACKGROUND OF THE INVENTION

The present invention relates to the field of fabrication, measurement, repair, and maintenance of cylindrical structures such as pipes, tubes, and conduits. A known problem with on-site fabrication (as opposed to original manufacturing), maintenance, and repair of pipes, tubes, and conduits has been to locate such a structure's geometric center axis and to maintain the position of a complementary apparatus in relation to that axis. This problem is compounded by the inability of certain devices known in the prior art to find and hold a center axis in more than one geometry of pipe or tube. For example, a means for finding and holding a center axis in a cylindrical pipe may not effectively perform this same function in an elliptical pipe. Further complicating these activities are transitions between dissimilarly shaped pipes that taper up or down to greater or lesser cross sections as may be desired to achieve differing fluid flow movements.

Certain pipe clamp designs known in the prior art appear to teach variations of a design that employ a threaded or substantially threaded shaft that axially and/or radially extends and retracts various mechanical contacting members (for example, scissors-type mechanisms) so as to engage or disengage the device with the interior surface of a section of a host pipe. See, for example, the following:

1) U.S. Pat. No. 6,464,127 to Litwinski teaches a clamp device having internal pipe surface multiple contact shoes that are brought to bear by a screw-actuated scissors mechanism, there being enough individual scissors mechanisms positioning enough contact shoes to effectively form an internal ring that counteracts the forces of pipe welding operations and that would otherwise cause internal deformation of the pipe but for the presence of the contact shoes to support the pipe against such deformation.

2) U.S. Pat. No. 5,076,025 to Reeble discloses a relatively lightweight center-finding device in which a central plunger rod activates a scissors mechanism to outwardly force a number of contact members against the interior surface of a pipe and drive the centerline plungers into axial alignment with the geometric axis of the pipe.

3) U.S. Pat. No. 2,615,413 to Adams et. al. shows a threaded centerline shaft that when rotated by an operator will cause multiple scissors mechanisms to bring contact shoes to bear onto the interior surface of a pipe with tensional force being maintained on the scissors mechanisms by a spring bias provided by a coil spring sitting in axial alignment with the centerline shaft.

4) U.S. Pat. No. 725,874 to Riley shows an early approach to the problem of wiping debris from a pipe joint's interior surface by the application of a rotating centerline shaft whose threads force a scissors mechanism into sufficient contact with debris sitting on the inside surface of a pipe to allow the contacts, configured as scrapers, to scrape the debris off when the entire mechanism is twisted by the operator.

5) U.S. Pat. No. 3,330,021 to Jacobsen teaches a series of scissors mechanisms oriented along a centerline and actuated by a threaded shaft under high torsional force so as to force adjacent sections of pipe into alignment for welding and to act as a welding jig.

6) U.S. Pat. No. 3,243,879 to Gill illustrates a scissors mechanism actuated by a centerline drive shaft so as to force cutters into position inside a pipe and effect through-cuts via radial motion through the pipe wall and to thus cut the pipe to length at that point.

7) U.S. Pat. No. 2,323,039 to Hill shows a flange holding jig where a threaded centerline actuating shaft fixes, via a hinged (non-scissors) mechanism that affords high force grip inside the surface of a pipe, a flange into proper axial-centered position on a pipe section for welding.

Accordingly, a need exists for a solution to at least one of the aforementioned traditional challenges, as well as more novel challenges, in piping clamp design. More specifically, a need exists for a device that can reliably find the geometric center axis or line of a pipe, tubing or conduit, that can firmly anchor itself inside with reference to that center axis or line, that can hold a rod or shaft in perfect coordination with such a center axis or line, that can act as a mount for measurement and repair sub-devices or tools, that can move desired devices to desired positions and hold those positions along the interior length of a pipe or tube, that can assist in difficult insertions or extractions of equipment, and all the while maintaining a position that remains in steady alignment with the geometric center axis or line of the pipe or conduit. None of the prior art mechanisms reviewed hereinabove are configured to operate within a non-cylindrical pipe (for example, an elliptical pipe), nor enable any use of a centerline shaft for any purpose other than to transmit force outward radially via a mechanism, such as a scissors mechanism or a lever mechanism, where great force is required for maintaining contact between the device and the interior of the pipe (e.g., for welding, pipe cutting, pipe cleaning, and/or pipe alignment). None of the prior art inventions locomote travel or motion by the clamping device axially through the interior of a pipe, and none of them enable their respective mechanisms to act as a platform or carrier for other tools, measures, or devices that may be useful in working within a length of pipe. There is no teaching of a system of assembled symmetrically-formed linkages that are interoperably connected in series and comprise opposing hinge or toggle joint pairs, nor that are joined by a common collar or linkage assembly block, nor having entry and exit shaft alignment collars or linkage assembly blocks, with common bores along a centerline axis. These are all features and capabilities of the present invention as disclosed and claimed, which provides solutions to the multiple shortcomings of prior art inventions in this field.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a centerline clamp assembly sized to be inserted into an end aperture of a pipe structure, characterized by two or more symmetrically-formed linkages interoperably connected in series, with each of these linkages comprising respective opposing toggle joint pairs joined at their inner ends to a shared common collar and at their outer ends by a respective entry collar and an exit collar, with all collars defining a respective bore configured to concurrently receive and hold a shaft in position along a common geometric centerline axis of the pipe. The term "collar"' may also be referred to herein as a "linkage assembly."

In one embodiment of the present invention, a centerline clamp assembly may comprise a first linkage assembly and a second linkage assembly. Positioned between these linkage assemblies may be one or more common linkage assemblies. Each of these types of assemblies may define a respective bore such that the bores of all assemblies may be aligned along a common axis. Linkages operably connected within each assembly may comprise a number of toggle joints, each in turn comprising a first arm pivotally connected to a second arm at a joint, with the first arm terminating proximate the joint in a contact surface member for contacting the interior surface of a pipe. The common linkage assembly may be pivotally connected to the respective second arms of each of the linkages' toggle joints. The first linkage assembly may be pivotally connected to the respective first arm of each of a first subset of the linkages' toggle joints, and may be configured to actuate along the same common axis to position the respective second arm of each of the first subset of the linkages' toggle joints at a first angle between 0 degrees and 90 degrees with respect to the common axis. The second linkage assembly may be likewise pivotally connected to the respective first arm of each of a second subset of the linkages' toggle joints, and may be configured to actuate along the same common axis to position the respective second arm of each of the second subset of the linkages' toggle joints at a second angle between 0 degrees and 90 degrees with respect to the common axis.

This first linkage assembly may be further configured to actuate or move along the clamp's common axis axially toward the common linkage assembly, and when it does so then it may operate to radially increase the first angle with respect to the common center axis. The first linkage assembly may be further configured to conversely actuate or move along the common axis away from the common linkage assembly, and when it does so then it may operate to radially decrease the first angle with respect to the common axis.

Each of the described assemblies may further define respective bores which in the assembled clamp may be characterized by a common axis. The bores may be configured to receive a shaft (for example, and without limitation, a straight cylindrical shaft). The plurality of linkages may further comprise at least one pair of the linkages positioned symmetrically opposed through respective ranges of motion with respect to the common axis (i.e. their range of motion may be equal and opposite to those on the opposed side). The linkages may be symmetrically opposed through their respective ranges of motion, which preferably pivot through a hinge motion traveling in a single plane where the common axis is coplanar (i.e. the axis does not pass through the plane). In another embodiment, the centerline clamp assembly may feature a contact shoe (e.g., a contact surface member) position at the terminus of the first arm of a toggle joint (e.g., proximate the joint). For example, and without limitation, the shoe may be rounded and intended to make contact with a point on the interior surface of a pipe.

In yet another embodiment, the centerline clamp of the present invention may be utilized by a method of selectively actuating the first linkage assembly along the common axis to position each first arm of the plurality of the linkages' toggle joints at a first angle between 0 degrees and 90 degrees with respect to the common axis; and then selectively actuating the second linkage assembly along the common axis to position the first arm of each of a second plurality of the linkages' toggle joints at a second angle between 0 degrees and 90 degrees with respect to the common axis. In this fashion, the first linkage assembly may be actuated along the common axis axially toward the common linkage assembly so as to radially increase the first angle with respect to the common axis, and then the converse action may be actuated along the common axis axially away from the common linkage assembly so as to radially decrease the first arm angle with respect to the common axis. This actuation activity may be accomplished by the action of the shaft inserted (e.g., threadedly received) into the bore of the second linkage assembly along the center axis so as to facilitate linear actuation and/or movement of the first linkage assembly, the second linkage assembly, and/or the common linkage assembly along the common axis.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout all views of the Figures (i.e. parts are not re-numbered for identification in different Figures).

DETAILED DESCRIPTION OF THE INVENTION

The present invention will now be described more fully hereinafter with reference to the accompanying drawings, in which preferred and alternative embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those of ordinary skill in the art.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

As used herein, the word “exemplary” or “illustrative” or “shown” means “serving as an example, instance, or illustration.” Any implementation described herein as “exemplary” or “illustrative” is not necessarily to be construed as preferred or advantageous over other implementations. All of the implementations described below are exemplary implementations provided to enable persons of ordinary skill in the art to make or use the embodiments of the disclosure without undue experimentation or a degree of experimentation beyond that which is customary in the art, and are not intended to limit the scope of the disclosure, which is defined by the claims.

Referring initially to FIGS. 1A, 1B, 1C, 2, 3A, 3B, 4A, and 4B, a centerline clamp assembly according to an embodiment of the present invention is now described in detail. Throughout this disclosure, the present invention may be referred to as a centerline clamp assembly, a centerline clamp, a clamp assembly, a centerline assembly, a clamp, an assembly, a device, a system, a product, and/or a method for using the same. Those skilled in the art will appreciate that this terminology is only illustrative and does not affect the scope of the invention. For instance, the present invention may just as easily relate to collapsible interior-fitting holding clamp technology deployed in other than piping implementations.

Figure 1A:
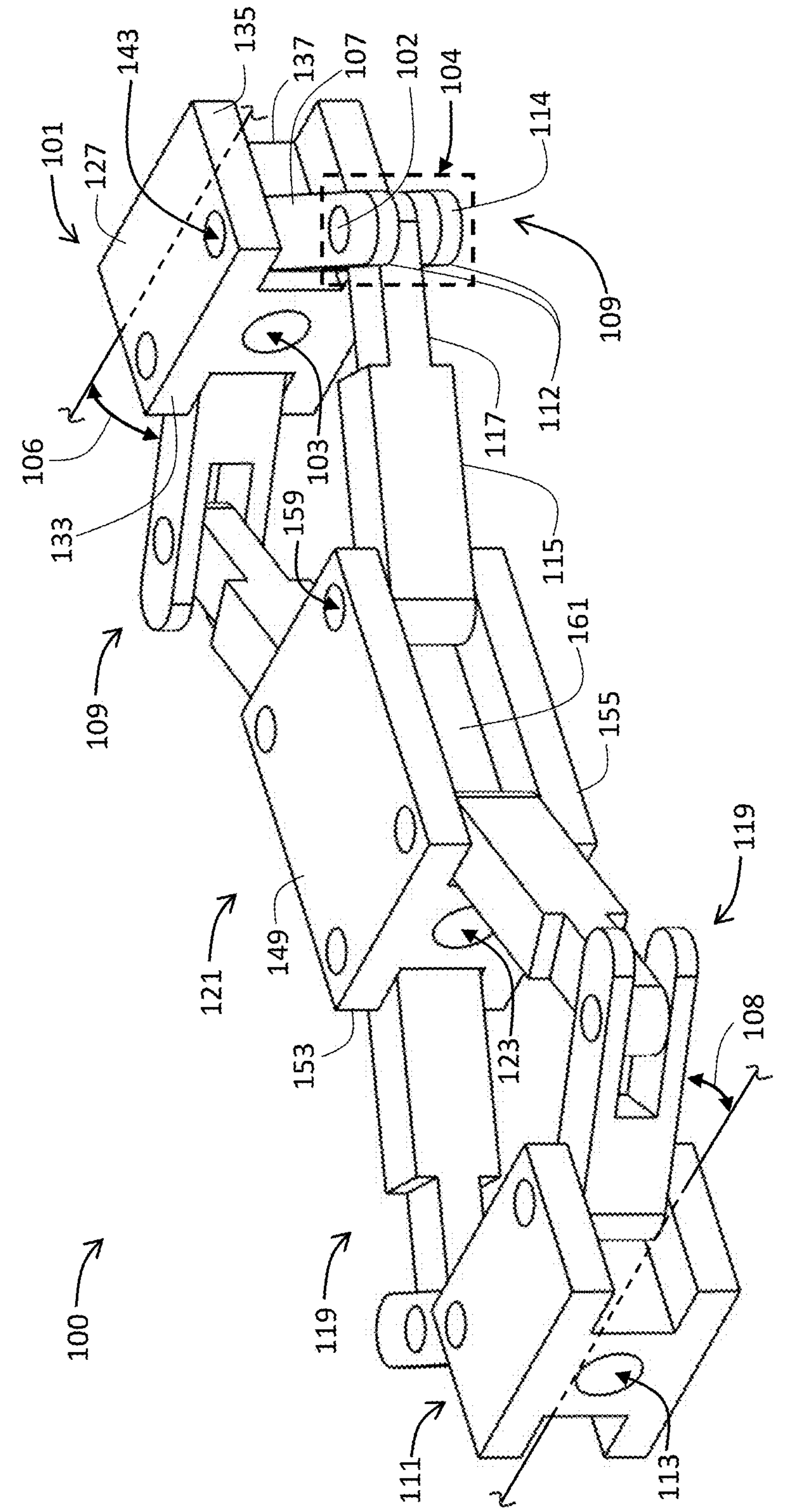
FIG. 1A is a perspective view of a centerline clamp assembly according to an embodiment of the present invention.
Figure 1B:
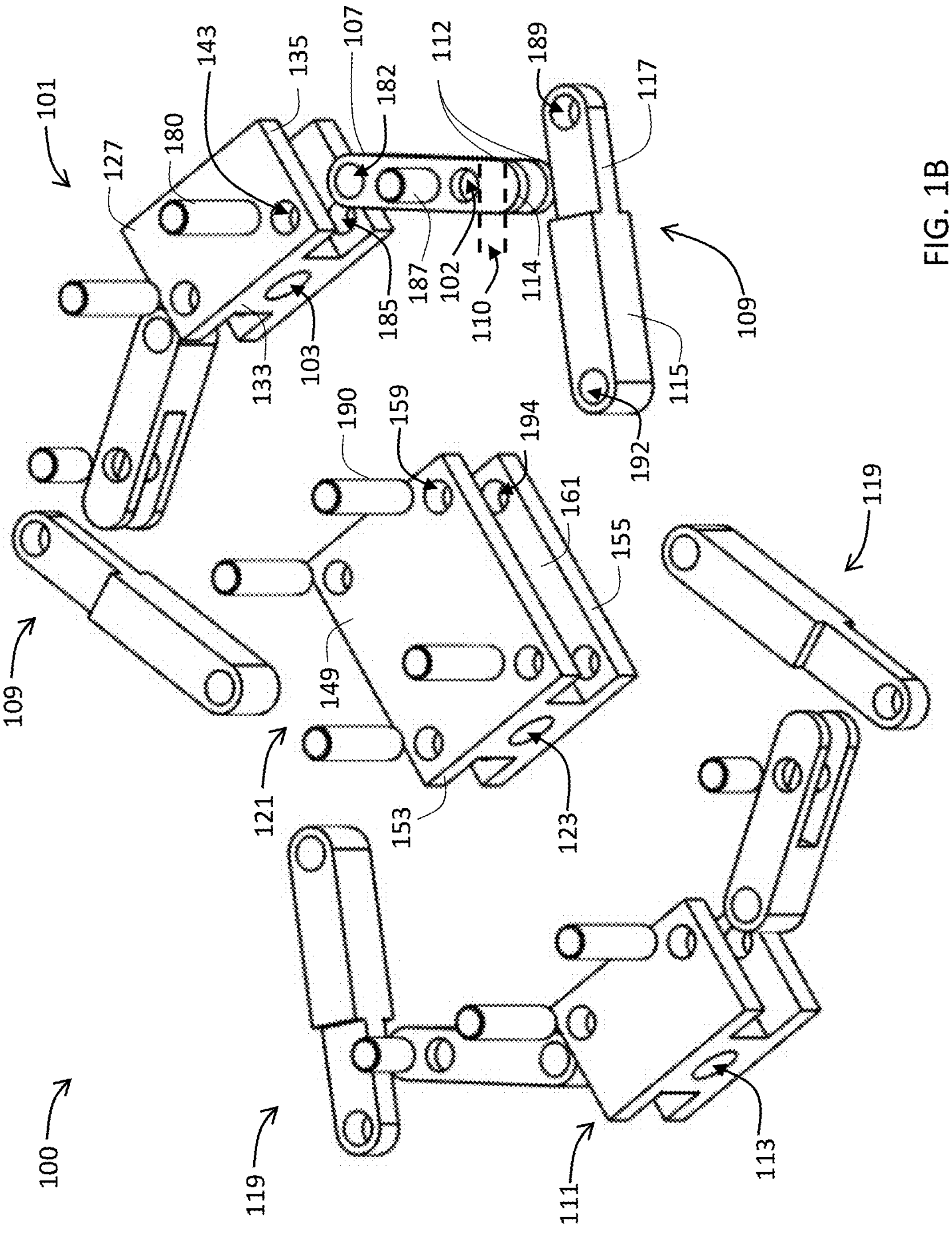
FIG. 1B is an exploded perspective view of the centerline clamp assembly of FIG. 1A.

Referring now to FIGS. 1A and 1B, in more detail, a centerline clamp assembly 100, according to an embodiment of the present invention, may comprise a first linkage assembly 101, a second linkage assembly 111, and a common linkage assembly 121. The first linkage assembly 101 may be characterized by a first bore 103, the second linkage assembly 111 may be characterized by a second bore 113, and the common linkage assembly 121 may be characterized by a third bore 123. Referring additionally to an exemplary elliptical pipe clamping application 300 of FIGS. 3A and 3B, each of the bores 103, 113, 123 may be dimensionally configured to receive a shaft means 304. For example, and without limitation, the shaft means 304 may be smooth, threaded, or a combination of alternating and/or varying sections of smooth and threaded lengths. Also for example, and without limitation, components of the centerline clamp assembly 100 may be fabricated (e.g., machined, 3D printed) from a suitable material (e.g., metal, plastic, fiber).

Figures 3A, 3B:
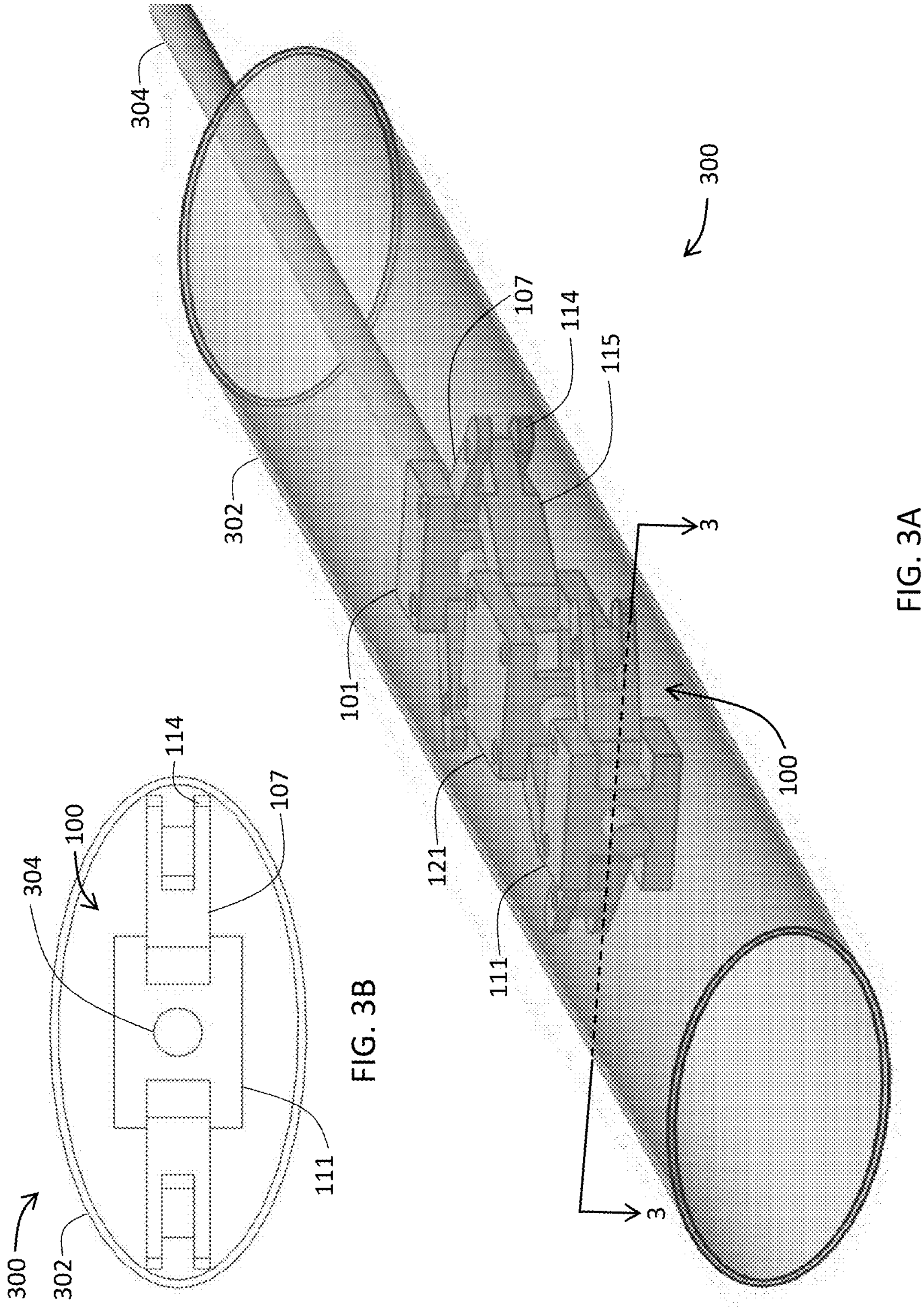
FIG. 3A is a perspective view of the centerline clamp assembly of FIG. 1A as deployed inside an elliptical pipe with a centerline shaft inserted into the shaft receiving bores of the sub-assemblies of the clamp, and in which gangs of toggle joints are sited and move through ranges of motion in a single plane according to an embodiment of the present invention.
FIG. 3B is a cross-sectional view of the centerline clamp assembly as deployed inside the elliptical pipe as taken along line 3-3 of FIG. 3A.

In the embodiment of the centerline clamp assembly 100 illustrated in FIGS. 1A, 1B, and 3A, the first bore 103 may be axially aligned with the common bore 123 and the second bore 113 so as to constitute receiving means for the shaft means 304 that may be fabricated to be accurately axially linear, such that when such an axially linear shaft 304 is inserted into such bores 103, 113, 123, all components of the centerline clamp assembly 100 may be aligned along a common linear axis. The first linkage assembly 101 thus may be configured to receive the shaft 304 and thereafter to be in axial alignment by the shaft 304 with the rest of the components 111, 121 of the clamp 100.

The first linkage assembly 101 in the embodiment 100 shown in FIGS. 1A and 1B may constitute a substantially rectilinear block through which the bore 103 may be drilled or otherwise fabricated, and having substantially planar faces (for example, and without limitation, upper face 127, inner face 133, two lateral faces 135, as well as it being understood that the first linkage assembly 101 may further include an outer face opposed to the inner face 133, and a lower face opposed to the upper face 127). FIGS. 1A and 1B show that first linkage assembly 101 may be characterized by opposing slots 137 fabricated into the opposing lateral faces 135 to accommodate attachment of linkages in the form of paired toggle joints 109. For example, and without limitation, the opposing slots 137 may provide adequate space for the positioning of a first arm 107 of one of the pair of toggle joints 109 and to provide sufficient space for the first arm 107 to freely rotate in alignment with a hinge pin 180 that may be inserted into a hinge bore 143, and thence through an arm bore 182 in a distal end of arm 107, thus forming a hinging means for effectuating the free rotation. A person of skill in the art will immediately recognize that an operable hinging means for the present design is not limited to a hinge pin, but may include any type of fastener that may achieve the same result (e.g., a threaded fastener and nut; a threaded fastener threadedly received by a respective bore in any component of the centerline clamp assembly 100). Once a distal end of arm 107 may be situated into the slot 137, and a suitable hinge pin means may be inserted into the hinge bore 143 and thence through an arm bore 182 in the distal end of arm 107, and thence through a second hinge bore 185 partially or wholly drilled or otherwise fabricated through linkage assembly 101, this completed first hinging means may achieve free rotation of the arm 107.

Arm 107 may further comprise a proximal end in which, to provide a second hinging means, a slot may be cut, flanked by upper and lower flanges 112, the slot dimensioned to receive an insertion tongue 117 that may constitute the proximal end of a second arm 115 of one of the pair of toggle joints 109. Second arm 115 may be configured to freely rotate in alignment with a hinge pin 187 or other hinging means that may be inserted into an arm bore 102 in the upper flange 112 of first arm 107, and thence through an arm bore 189 in the tongue 117, and thence through an arm bore (not shown) in the lower flange 112, thereby completing a second hinging means (also referred to herein as a joint 104) that may achieve free rotation of first and second arms 107 and 115 in alignment with their connecting hinging means. As illustrated in FIG. 1B, the second arm bore 189 may be positioned proximate the proximal end of the second arm 115, while the first arm bore 102 may be positioned substantially longitudinally inward (i.e., in a distal direction) from the proximal end of the first arm 107. Thus, positioning of the joint at arm bores 102, 189 may define in the upper flange 112 of first arm 107 a gripping appendage 110 extending lontiduinally outward form the joint and ending in a contact surface member 114 (also referred to hereinafter as a shoe). So configured, the insertion tongue 117 of the second arm 115 may not present a gripping appendage nor a contact surface member proximally outward of the joint shared with the first arm 107.

A proximal end of the second arm 115 may be brought into the ability to freely rotate in alignment with a hinge pin 190 or other hinging means inserted into an anchoring bore 159 that may be drilled or otherwise fabricated into a common linkage assembly 121. Common linkage assembly 121 may serve multiple functions and, in the embodiment illustrated in FIGS. 1A and 1B, may be configured as a substantially rectilinear block, again fabricated from a suitable material as described above, and which may define multiple hinge bores to receive hinging means; may act as a pivot point for a plurality of hinge means; and may act as a second line of alignment around an inserted shaft means. Also for example, and without limitation, any or all of the first linkage assembly 101, the second linkage assembly 111, and the common linkage assembly 121 may act as a platform(s) for the installation and/or incorporation of a wide range of tools, sensors, cameras, location transmitters, and other devices, as will be more fully described below.

In certain embodiments, and as illustrated in FIGS. 1A and 1B, common linkage assembly 121 may include an upper face 149, it being understood that there may be an opposing lower face, lateral faces 155, and inner and outer faces 153. This exemplary embodiment shows that a slot 161 may be fabricated along lateral face 155 so as to provide adequate space for the positioning of the second arm 115 of one of the pair of toggle joints 109, and to provide sufficient space for the arm 115 to freely rotate in alignment with a hinge pin 190 or other hinging means inserted into the anchoring bore 159, and thence through an arm bore 192 in a distal end of arm 115, thus forming a hinging means for effectuating the free rotation. In this embodiment, once a distal end of arm 115 is situated into the slot 161, and a suitable hinging means has been inserted into said the anchoring bore 159 and thence through an arm bore 192 in the distal end of arm 115, and thence through a second anchoring bore 194 partially or wholly drilled or otherwise fabricated through the common linkage assembly block 121, this third hinging means may be substantially complete and free rotation of the arm 115 may be thus achieved. When these first, second, and third hinging means around first and second toggle joints 109, and constituting a first linkage, have been assembled on a distal side of the centerline clamp assembly 100, and when another pair of equally dimensioned first and second toggle joints 119 have been assembled on a proximal side of the centerline clamp assembly 100 as shown in FIG. 1A, then a pair of linkages exists in this embodiment that act in synchronous motion to cause identical and opposed hinging motions in both linkages.

Continuing to refer to FIGS. 1A and 1B, and referring additionally to FIGS. 3A and 3B, when both linkages move through their range of movement, first, the respective contact surface member 114 (e.g., shoe) on each gripping appendage 110 of each flange 112 of each first arm 107 may be operated to come into mechanical contact with the interior of a pipe 302, conduit, or tube. For example, and without limitation, both pairs of shoes 114 of a pairing of toggle joints 109, 119 may be caused to exert equal and opposite forces at their respective contact points. Bores 103, 113, 123 and hence, any shaft 304 within these bores 103, 113, 123 may be axially centered from the contact points of the shoes 114 and therefore axially centered in the interior space or lumen of the pipe 302, conduit, or tube. Movement of the linkages may be actuated by inducing motion of the first linkage assembly 101 in a direction colinear with that of the pipe 302, conduit, or tubes. This may be directly achieved by using a shaft means 304 that may be at least partially die-cut threaded on a portion of its length, with the threads coming into contact with and engaging into counter-threads tap-cut into the bore 103. The rotational circular motion of the threaded shaft 304 against the threads of the bore 103 of the first linkage assembly 101 may thus, for example, and without limitation, cause its linear motion in a worm drive effect. Rotation of the shaft 304 may be achieved by any suitable mechanical means. One suitable means for rotating the shaft 304 may for example be a jam nut assembly threaded fixedly onto the shaft 304 and which, when rotated with a suitable wrench means, may cause the shaft 304 to rotate, moving the first linkage assembly 101 axially which, in turn, may operate the linkages to expand radially outward to respective holding angles 106, 108 at which their respective shoes 114 make contact with the interior of the host pipe 302.

A person of skill in the art will immediately recognize that the entire mechanism described above for the linkages 109 and linkage assembly 101 positioned on a near side of the assembly 100 may be duplicated in reverse mirror image fashion on the far side of the assembly 100 (that is, opposite of assembly block 121 as illustrated in FIG. 1A). The dimensions of the first linkage assembly 101 and all toggle joint components 107 and 115 may be duplicated and assembled in like fashion to form the complete centerline clamp assembly 100 of FIG. 1A, which is shown with a total of four toggle joints 109, 119. After the entire clamp 100 is assembled, there are shown in the example embodiment of FIGS. 1A, 3A, and 3B not four, but eight contact points between arm shoes 114 and the interior surface of a pipe 302, conduit, or channel.

A centerline clamp configured as described above may potentially have the advantages of being able to rigidly find and hold the local centerline of both a round and non-round pipe (useful for the purpose, for example, of weld clamping); being able to manipulate pipe (such as during manufacturing, or to install or remove a subject pipe from magnets or other host devices); being able to align and hold on their geometric axes pipes of differing cross-sectional shapes (again, useful for weld clamping); enabling the mechanical or optical measurement of the extent of a bend and/or twist in a section of pipe; and to achieve robotic locomotion inside a round or non-round pipe.

Figure 2:
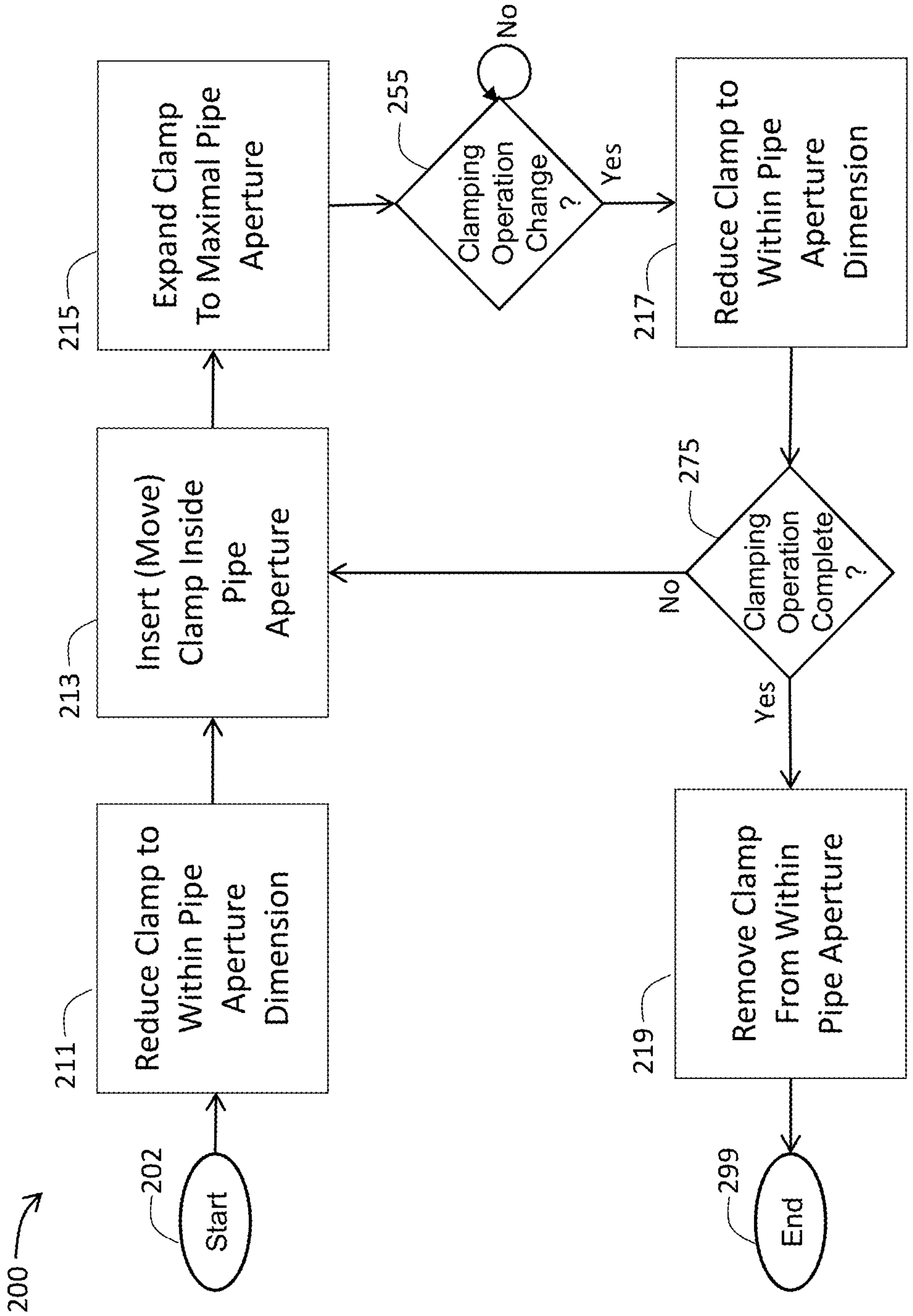
FIG. 2 is a block diagram generally describing a method of operating a centerline clamp assembly according to an embodiment of the present invention.

Referring now to FIG. 2. and continuing to refer to FIGS. 1A, 1B, 3A, 3B, 4A, and 41B, a method aspect of using a centerline clamp assembly 100 according to an embodiment of the present invention is now described in detail. More specifically, FIG. 2 illustrates a schematic flow chart 200 of exemplary steps that may be followed to engage and disengage the centerline clamp assembly 100 of the invention. The steps illustrated in FIG. 2 are generalized and applicable to numerous different embodiments of the invention. From the start at Block 202, an operator may select an embodiment of the centerline clamp assembly of the present invention for use in a given task, and may actuate the shaft 304 and/or otherwise manipulate the employed linkage assemblies 101, 111, 121 of the clamp 100 so as to reduce width of the clamp (Block 211) to a dimension that permits the clamp 100 to be inserted into a given pipe at Block 213. The user may then perform the reverse actuation on the clamp (Block 215) so that the clamp 100 may expand to the holding angle 106, 108 at which its shoe 114 may come into sufficient contact with the interior of the pipe so as to hold the clamp 100 in position during the performance of any necessary operations. At Block 255, if a change to the deployment of the clamp 100 is desired (e.g., repositioning), the operator may reduce the clamp 100 within the pipe aperture to release holding pressure. To reestablish a working hold at a different position within the pipe (Block 275), the operator may move the reduced clamp 100 within the pipe (Block 213) and repeat the steps described above. After completing desired operations at Block 275, the operator may reduce the clamp 100 again at Block 217 and may remove the clamp 100 from the interior of the pipe at Block 219. The method 200 may then end at Block 299.

Referring now to FIGS. 3A and 3B, and continuing to refer to FIG. 1A, the clamp 100 of the present invention configured to sit in the interior of an elliptically formed pipe 302 will now be discussed in detail. For example, and without limitation, a clamp 100 may be actuated about a threaded shaft 304 until all shoes 114 may be positioned in mechanical contact with the interior of the pipe 302. Once all shoes 114 are in contact, the center bores 103, 113, 123 may be positioned precisely in axial alignment with the geometric center axis (i.e., the centerline) of the elliptical pipe 302. As shown in FIGS. 1A and 3A, as taken along line of sight 3-3, the linkage assemblies 109, 119 chosen for this illustration may sit opposed to one another (i.e., both with respective linkages 107 characterized by respective holding angles 106, 108 tipped inward toward the center assembly 121 with respect to the centerline), thereby advantageously exerting sufficient equal and opposite axial force on the interior walls of the pipe 302 so as to enhance the ability of the clamp 100 to hold fast. For example, and without limitation, the symmetrical design of the clamp 100 may produce a "self-holding" effect that sees the linkage 109 increasing clamping pressure into a host pipe in response to pulling force in a direction from first linkage assembly 101 to common linkage assembly 121; and that sees the linkage 119 increasing clamping pressure into the host pipe in response to pulling force in a direction from second linkage assembly 111 to common linkage assembly 121.

Figure 1C:
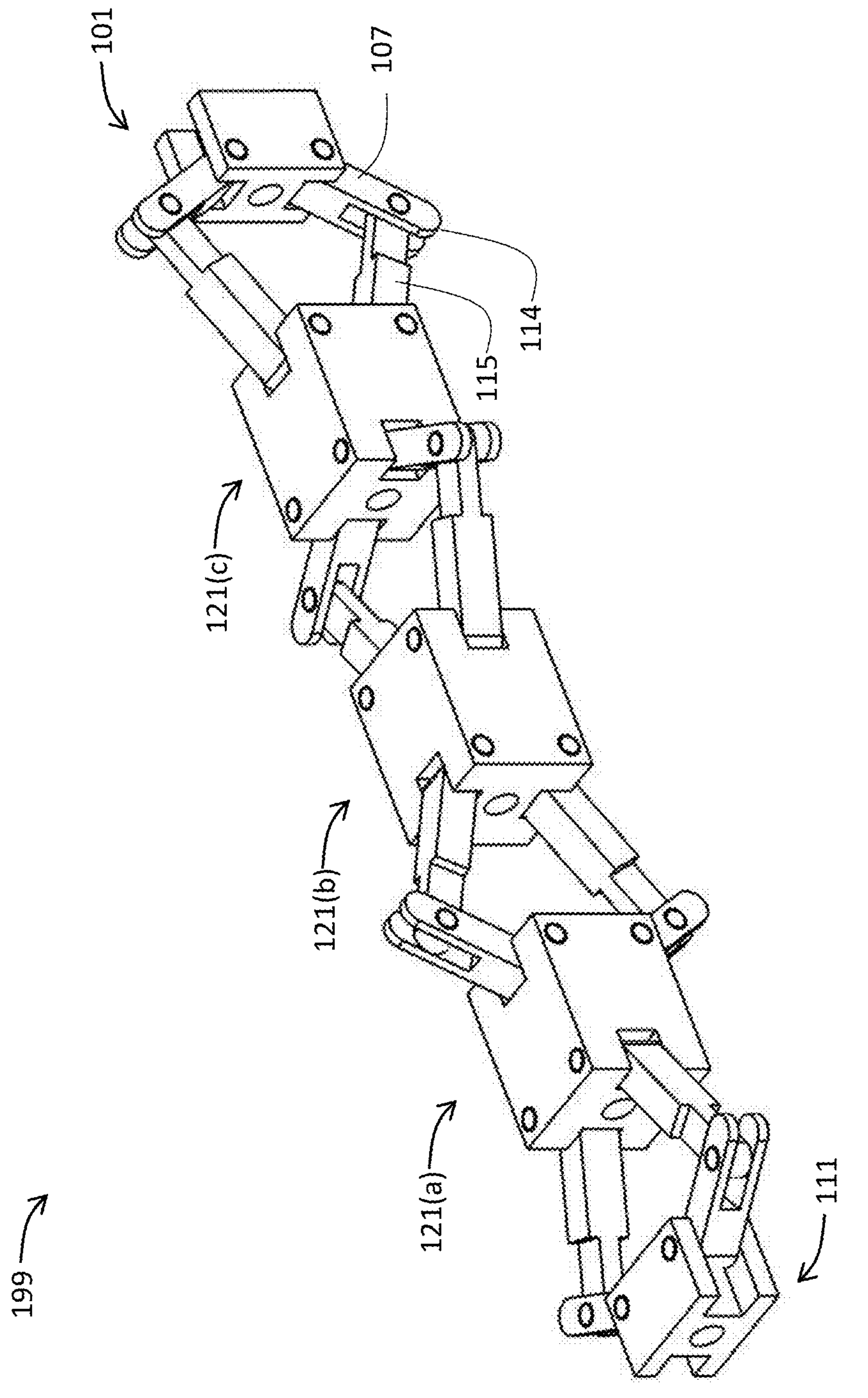
FIG. 1C is a perspective view of an alternative centerline clamp assembly according to an embodiment of the present invention.
Figures 4A, 4B:
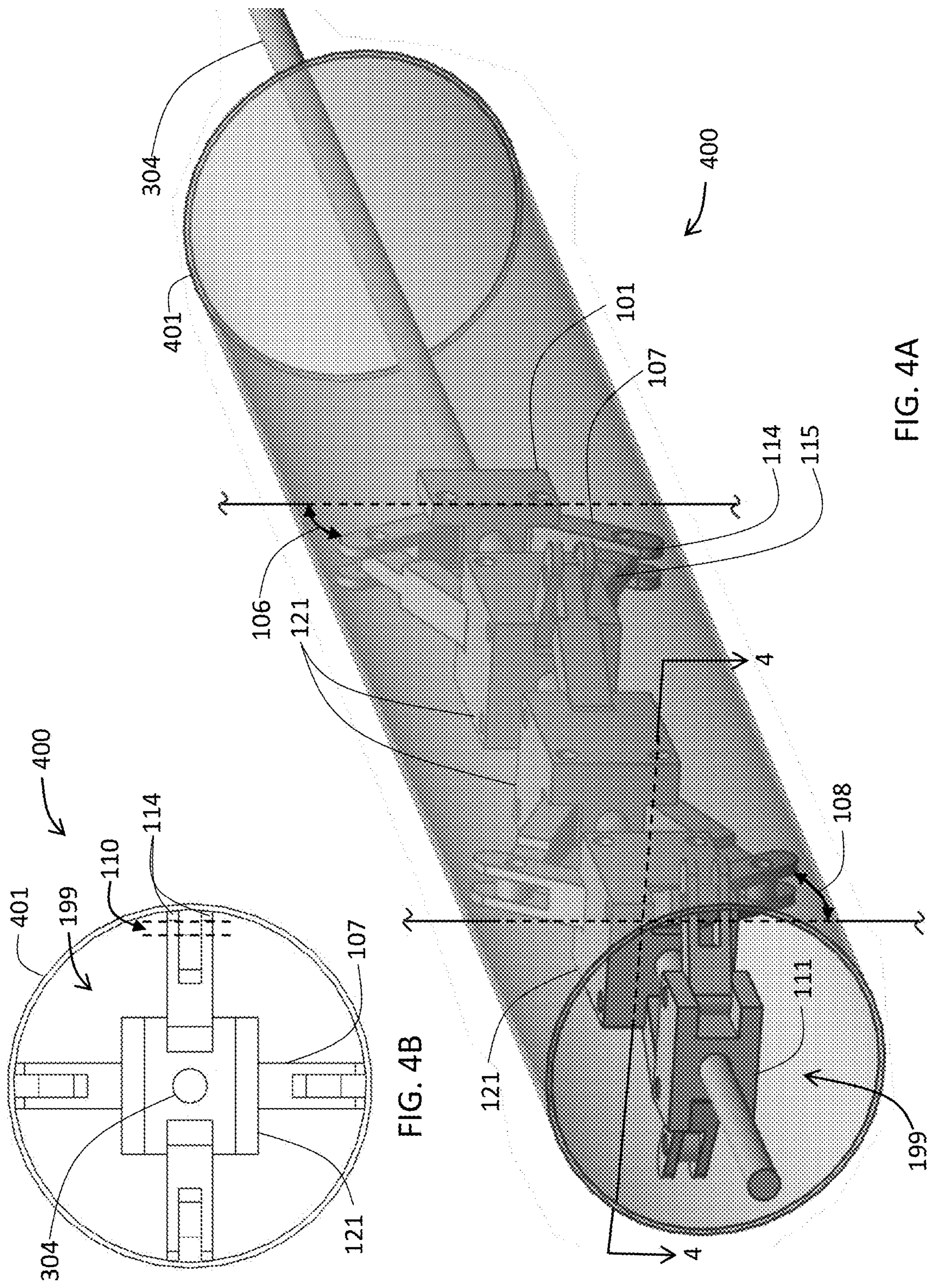
FIG. 4A is a perspective view of the alternative centerline clamp assembly of FIG. 1C as deployed in a cylindrical pipe with a centerline shaft inserted, and in which gangs of toggle joints are sited and move through ranges of motion in two planes perpendicular to one another according to an embodiment of the present invention.
FIG. 4B is a cross-sectional view of the alternative centerline clamp assembly as deployed inside the cylindrical pipe as taken along line 4-4 of FIG. 4A.

Referring now to FIGS. 4A and 4B, and referring additionally to FIG. 1C, an exemplary application 400 of an alternative embodiment of clamp 199 of the invention configured to sit in the interior of a cylindrically formed pipe 301 will now be discussed in detail. In this alternative embodiment, there are illustrated a total of eight toggle joints in four pairs (i.e., linkages), yielding sixteen illustrated contact shoes 114. The increased number of linkages and contacting shoes is made possible in this particular embodiment by increasing the number of common linkage assemblies 121 from that of one such assembly in embodiment 100 of FIG. 1A to three such assemblies 121(*a*), 121(*b*), 121(*c*) in embodiment 199. Furthermore, embodiment 199 in FIG. 4A illustrates that it is possible to assemble an embodiment in which the pairs of toggle joints may be configured in other than planar alignment as is illustrated for embodiment 100 in FIG. 1A. Instead, as illustrated, the four linkages of embodiment 199 in FIG. 4A may alternate between two planes, illustrated as being 90 degrees apart, or roughly in the relationship of an x-axis to a y-axis in a cartesian coordinate system. This design is additionally illustrated in FIG. 4B, which includes a cross-sectional view of embodiment 199 taken along line of sight 4-4. Alternating the planar orientation of linkages in series may advantageously reduce the possibility of exerting too much force along a single geometric plane on the interior of the pipe 401, which with softer alloys, could lead to undesirable deformation. Also, alternating the planar orientation of linkages in series may advantageously increase the fixedness of the threaded shaft 304 in alignment with the center axis of a host pipe, which is important when clamping to round (rather than, for example, elliptical) pipe. Those of skill in the art will appreciate that there is thus demonstrated that plural linkages may be selectively oriented in any desired number of different planes of hinge movement to suit multiple needs.

Figure 5:
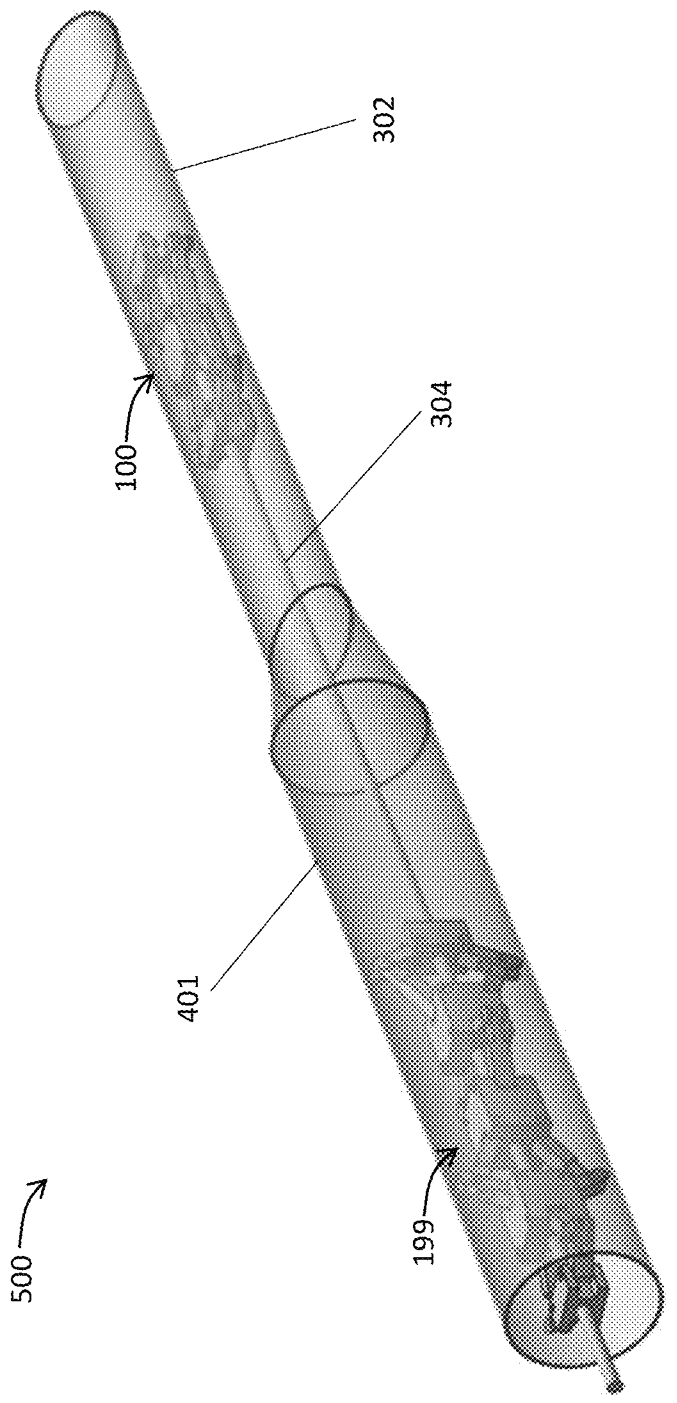
FIG. 5 is a perspective and partly sectional view of multiple centerline clamps deployed along a common axis fixed by an inserted centerline shaft, at different positions of a complex pipe having cylindrical, elliptical, and conical sections according to an embodiment of the present invention.

Referring now to FIG. 5, and continuing to refer to FIGS. 1A, 1C, 3A, 3B, 4A, and 4B, an exemplary application 500 of the present invention sitting in the interior of conjoined pipes of varying geometries will now be discussed in detail. The conjoined pipe illustrated in this example may comprise a cylindrical portion 401, an elliptical portion 302, and a custom-welded transitional section that both changes its geometry from cylindrical to elliptical and reduces the cross-sectional area of the pipe to, for example, and without limitation, advantageously alter fluid transmission rate. The clamp mechanism employed to facilitate joining of pipe 401 and pipe 302 may be selectively configured to combine elements of embodiments 100 and 199, utilizing a two-pair planar gang in the elliptical portion of the tube, and a four-pair co-planar gang in the cylindrical portion of the tube. The two-pair planar gang may be thin enough to enable its transit through the reduced cross-sectional area of the tube, and to give adequate clamping force in the elliptical portion. A shaft 304 inserted into the respective receiving bores of all components of this embodiment may be enabled to be brought into axial alignment with the geometric axis of all portions of the tube assembly regardless of their overall shape.

Figure 6A:
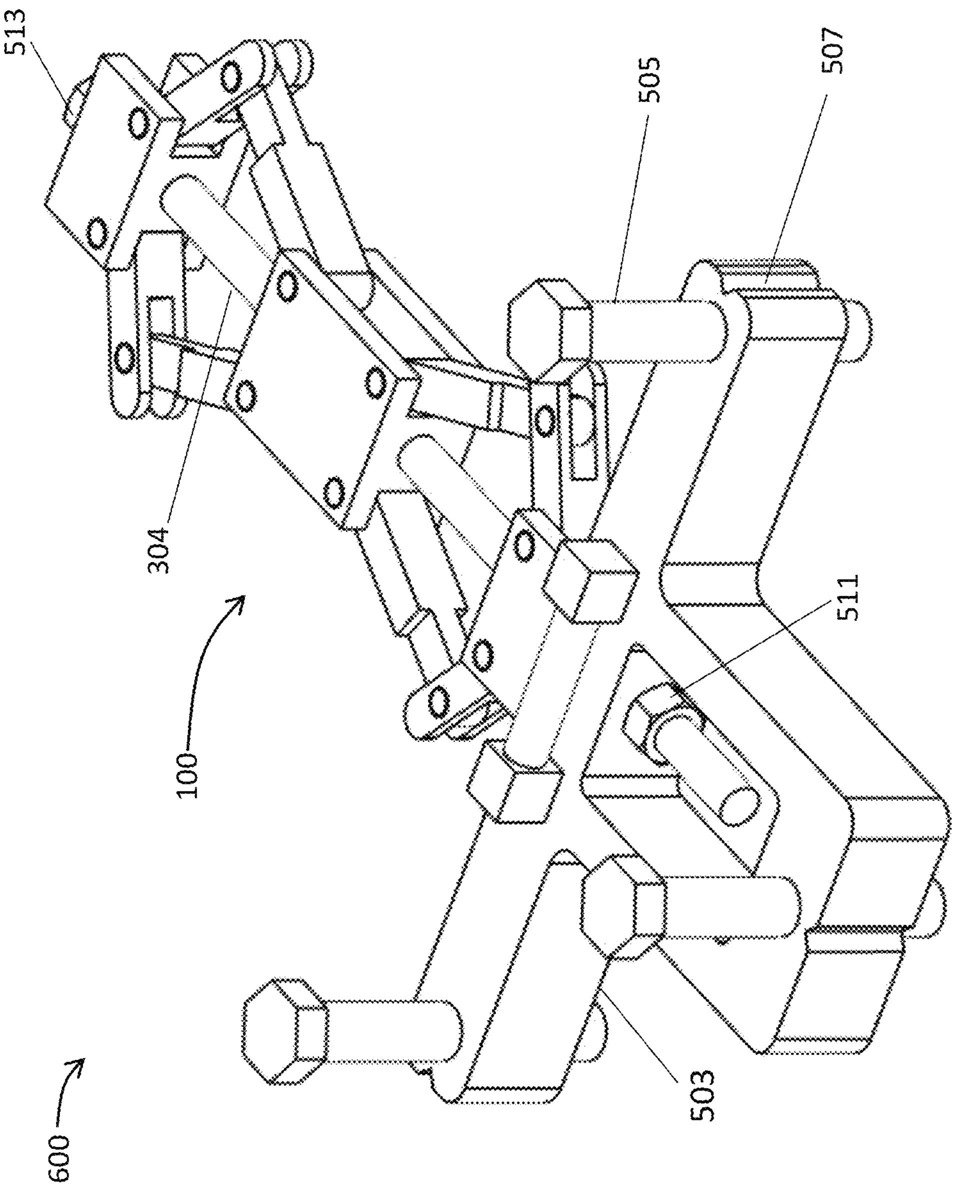
FIG. 6A is a front perspective view of a centerline clamp assembly configured for gage measurement according to an embodiment of the present invention.
Figure 6B:
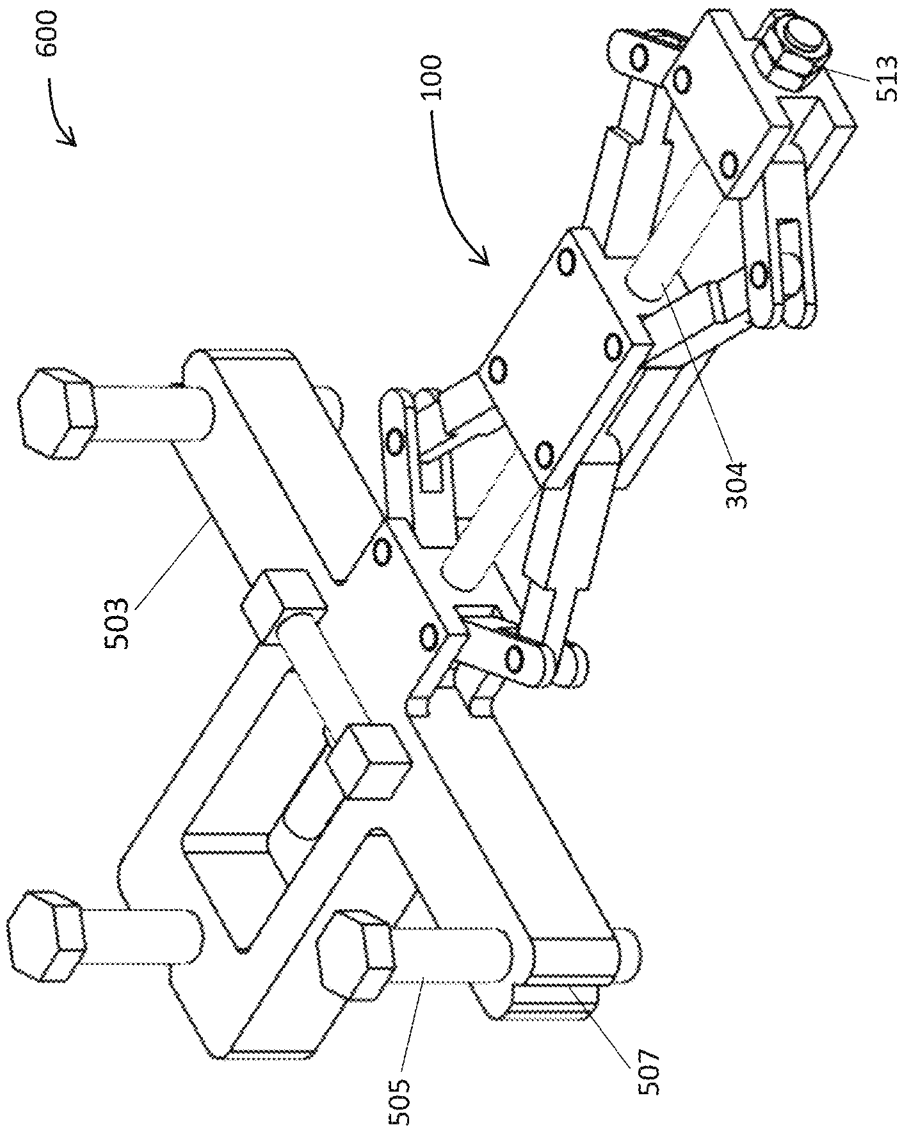
FIG. 6B is a rear perspective view of the centerline clamp assembly configured for gage measurement of FIG. 6A.
Figure 6C:
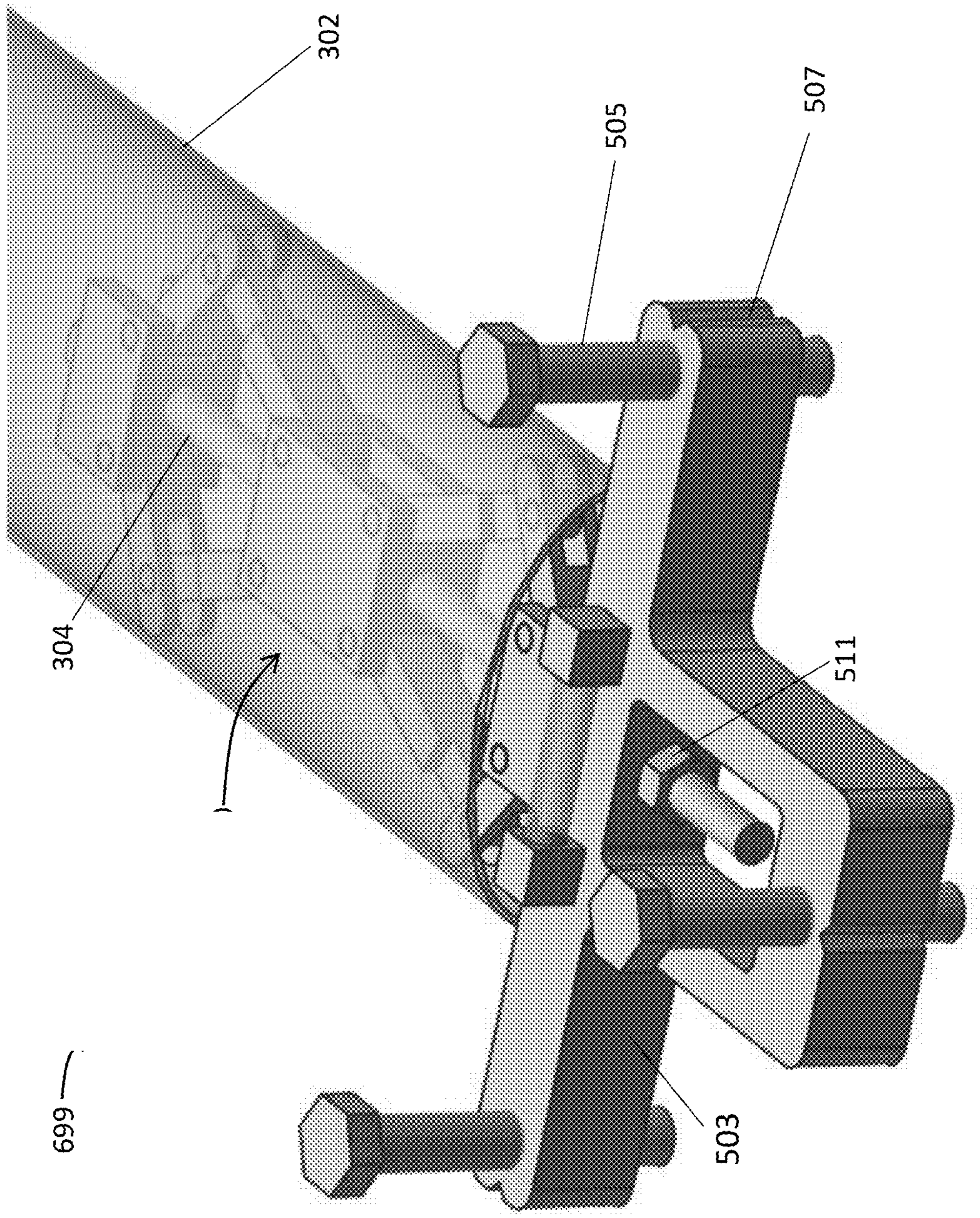
FIG. 6C is a perspective and partly sectional view of the centerline clamp of FIGS. 6A and 6B fixing in position a spirit marking gage for axis-relative measurement of an elliptical pipe according to an embodiment of the present invention.

Referring now to FIGS. 6A, 6B, and 6C, and continuing to refer to FIGS. 1A, 3A, 3B, 4A, and 4B, an exemplary application 699 of the clamp of the present invention to a specialty device 600 for determining straightness or relative degree of twist in a pipe on non-cylindrical geometry will now be discussed in detail. For example, and without limitation, a clamp of embodiment 100 may be inserted into an elliptical pipe 302 of relatively great width-to-height ratio and may be tightened in place by the procedure described above for FIG. 2, for example (note in FIGS. 6A, 6B and 6C the presence of tightening means including an actuation nut 511 and a jam nut 513). A straight shaft 304 may be then inserted into the bores of the clamp 100 as described above, while a portion of the shaft 304 may be inserted into a receiving bore of a spirit level marking gage 503 that may be, for example, and without limitation, mechanically affixed in a precisely aligned way to the end of clamp 100 (e.g., at second linkage assembly 111). Alternatively, as shown in FIGS. 6A, 6B, and 6C, also for example, and without limitation, gage 503 may be configured to wholly replace the end block of clamp 100 (more specifically, gage 503 may monolithically incorporate the second linkage assembly 111 from FIG. 1A into a single component). In either embodiment, the gage assembly 503 automatically may be aligned relative to the local major and minor axes of the elliptical cross-section of the pipe 302 as well as may be aligned longitudinally with the local centerline axis of the pipe 302. More specifically, shaft 304 may be brought into axial alignment with the geometric axis of the pipe 302, which in turn in this example has caused the gage 503 to be in axial alignment. The same procedure may be followed at the opposite aperture of the pipe 302, with the same or functionally similar type of clamp and the same or functionally similar type of gage, such that now two gages may be brought to be in axial alignment with each other and with the geometric axis of the pipe 302. Each of the three leveling bolts or screws 505 of gage 503 may be turned until they contact a tabletop or floor. The length of each screw extending past the bottom of gage 503 after adjustment may enable an operator to potentially completely metrically describe the amount of twist and vertical bend in the pipe being measured. Additionally, a marking gage 503 may optionally have marking grooves 507 vertically formed in the sides of the gage 503 that may be used to scribe a mark of reference from a tabletop surface or floor. The differential between any two marks may enable an operator to describe the amount of horizontal bend in the pipe 302. For example, and without limitation, say a subject pipe is oriented to point North-South for reference. If a first distance measured from the southeast marking groove mark 507 (on the table, floor, etc.) to the northeast marking groove mark 507, and a second distance measured from the southwest marking groove mark 507 to the northwest marking groove mark 507 are the same, then the subject pipe does not have a net horizontal bend in it. If, however, the first and second distances are different, the subject pipe may be deemed to be curving either to the left or to the right (i.e., horizontal bend).

Figure 7A:
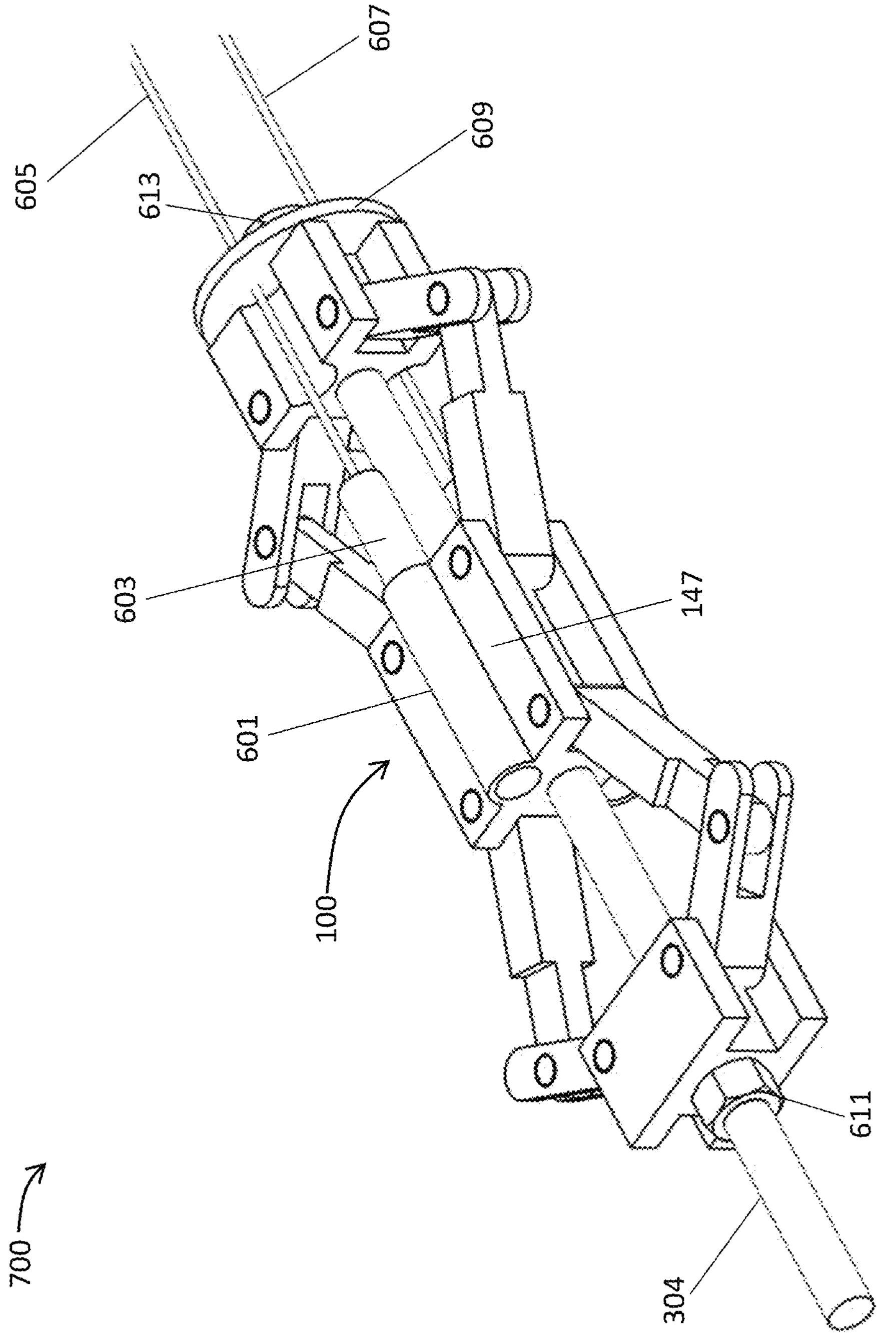
FIG. 7A is a front perspective view of a centerline clamp assembly configured for laser measurement generation according to an embodiment of the present invention.
Figure 7B:
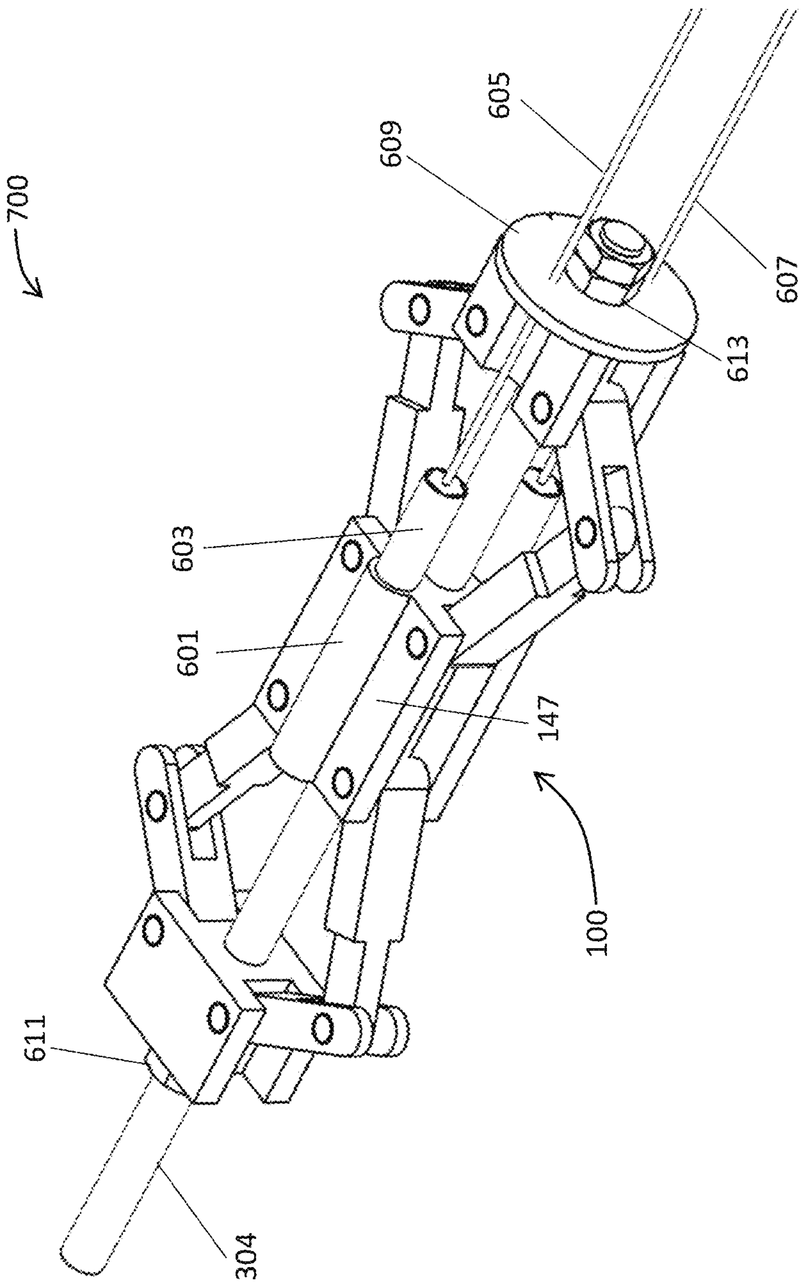
FIG. 7B is a rear perspective view of the centerline clamp assembly configured for laser measurement generation of FIG. 7A.
Figure 7C:
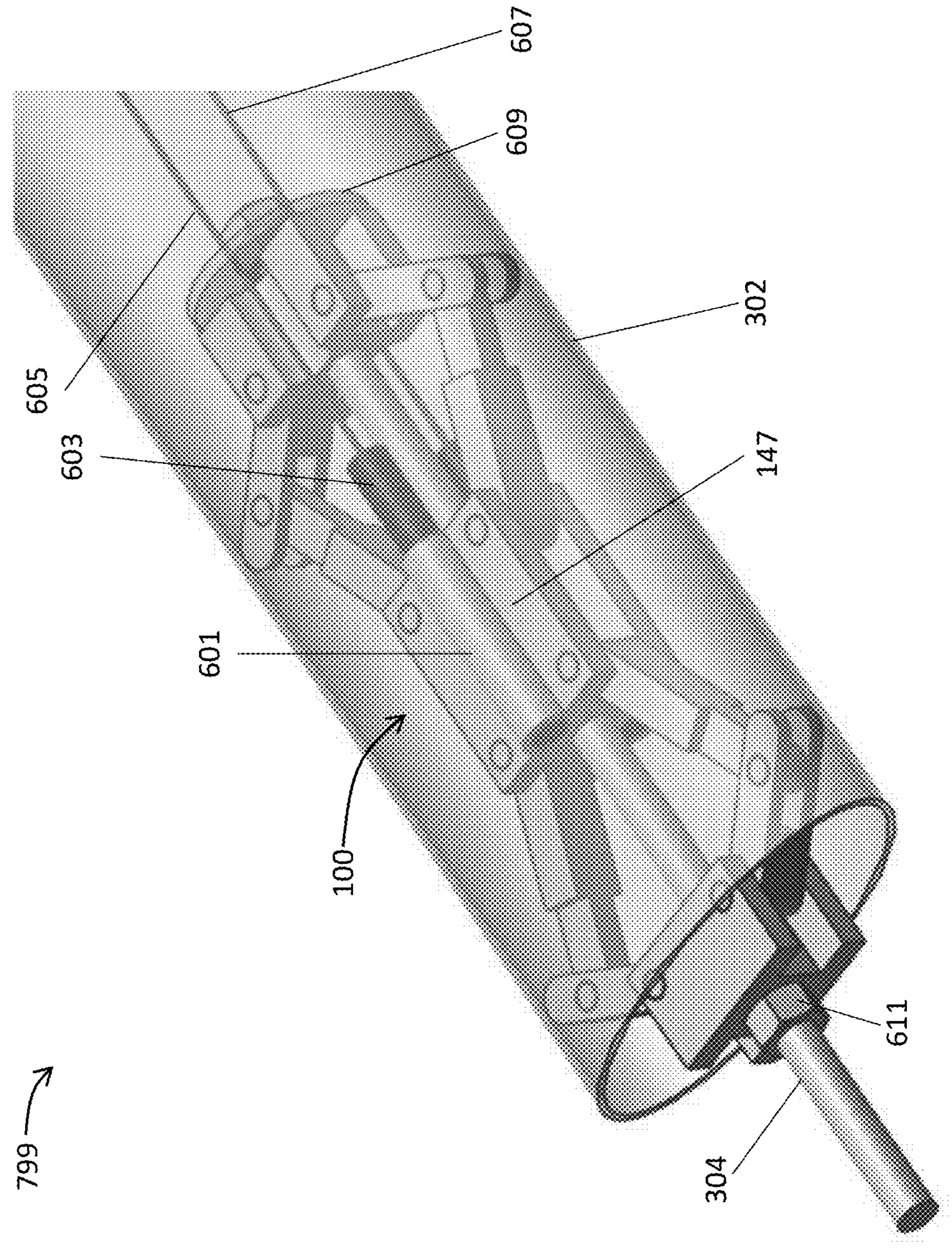
FIG. 7C is a perspective and partly sectional view of the centerline clamp of FIGS. 7A and 7B fixing in position a pair of laser beam generators casting respective parallel beams through an upstream polarizer for axis-relative measurement of an elliptical pipe according to an embodiment of the present invention.
Figure 8A:
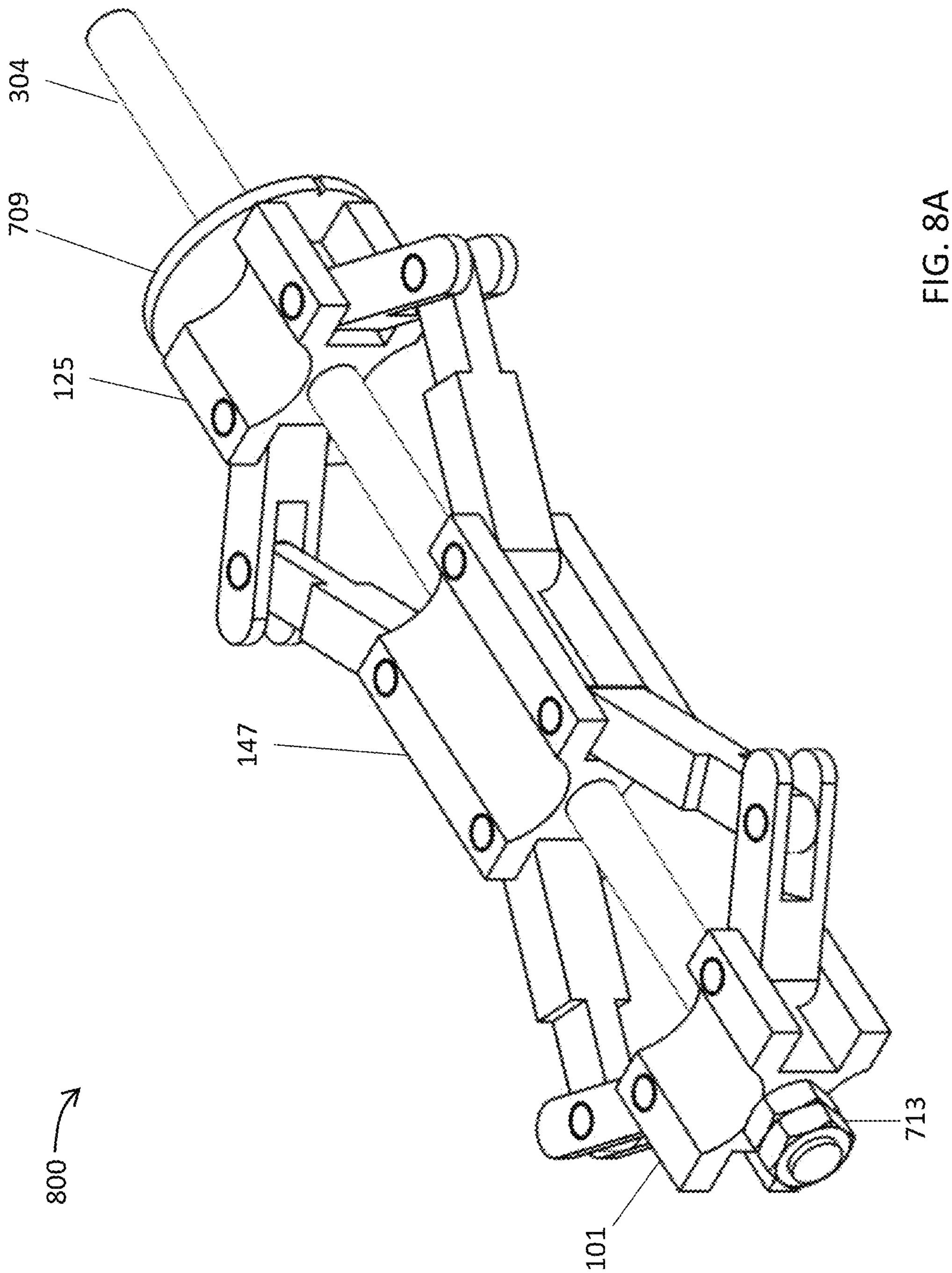
FIG. 8A is a front perspective view of a centerline clamp assembly configured for laser measurement reception according to an embodiment of the present invention.
Figure 8B:
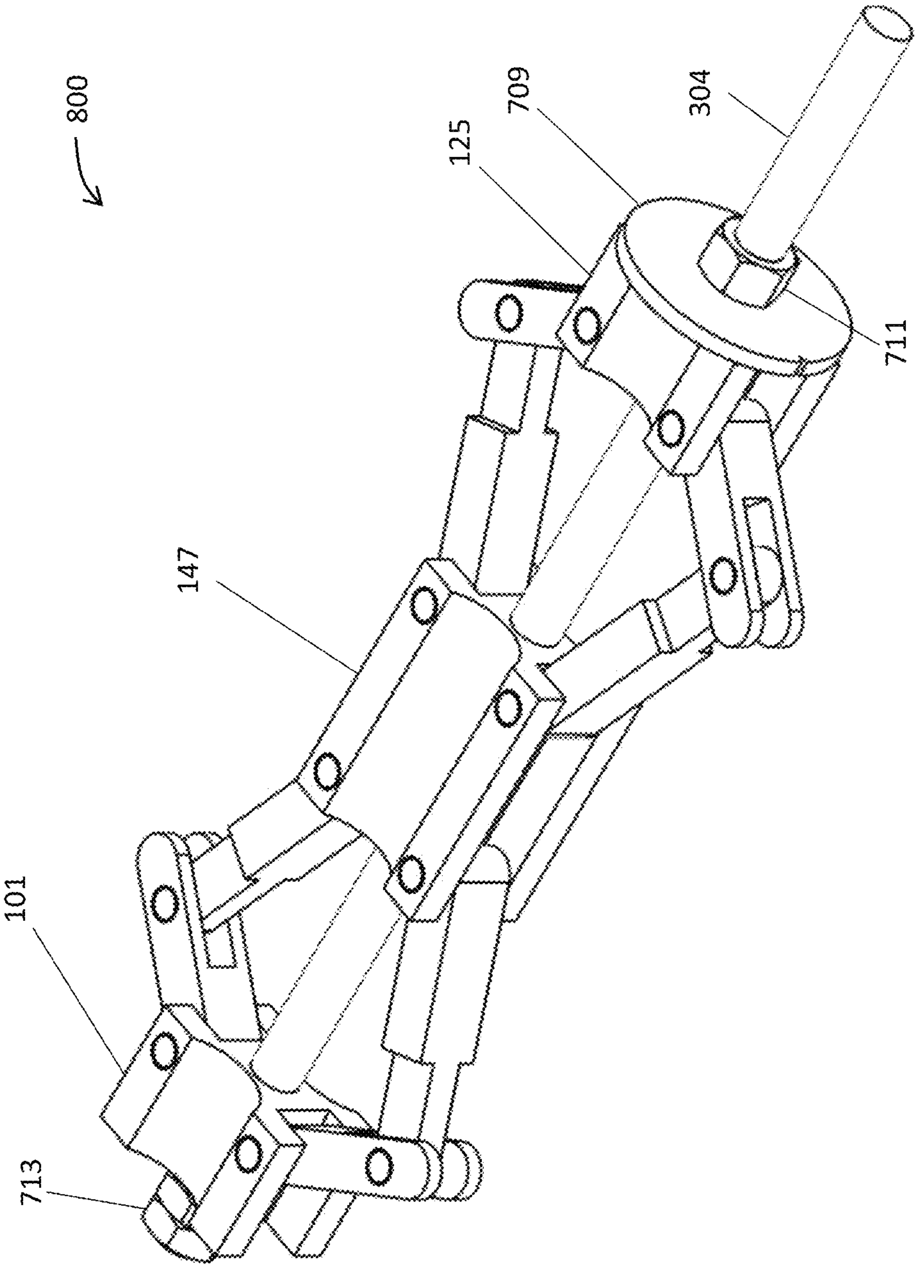
FIG. 8B is a rear perspective view of the centerline clamp assembly configured for laser measurement reception of FIG. 8A.
Figure 8C:
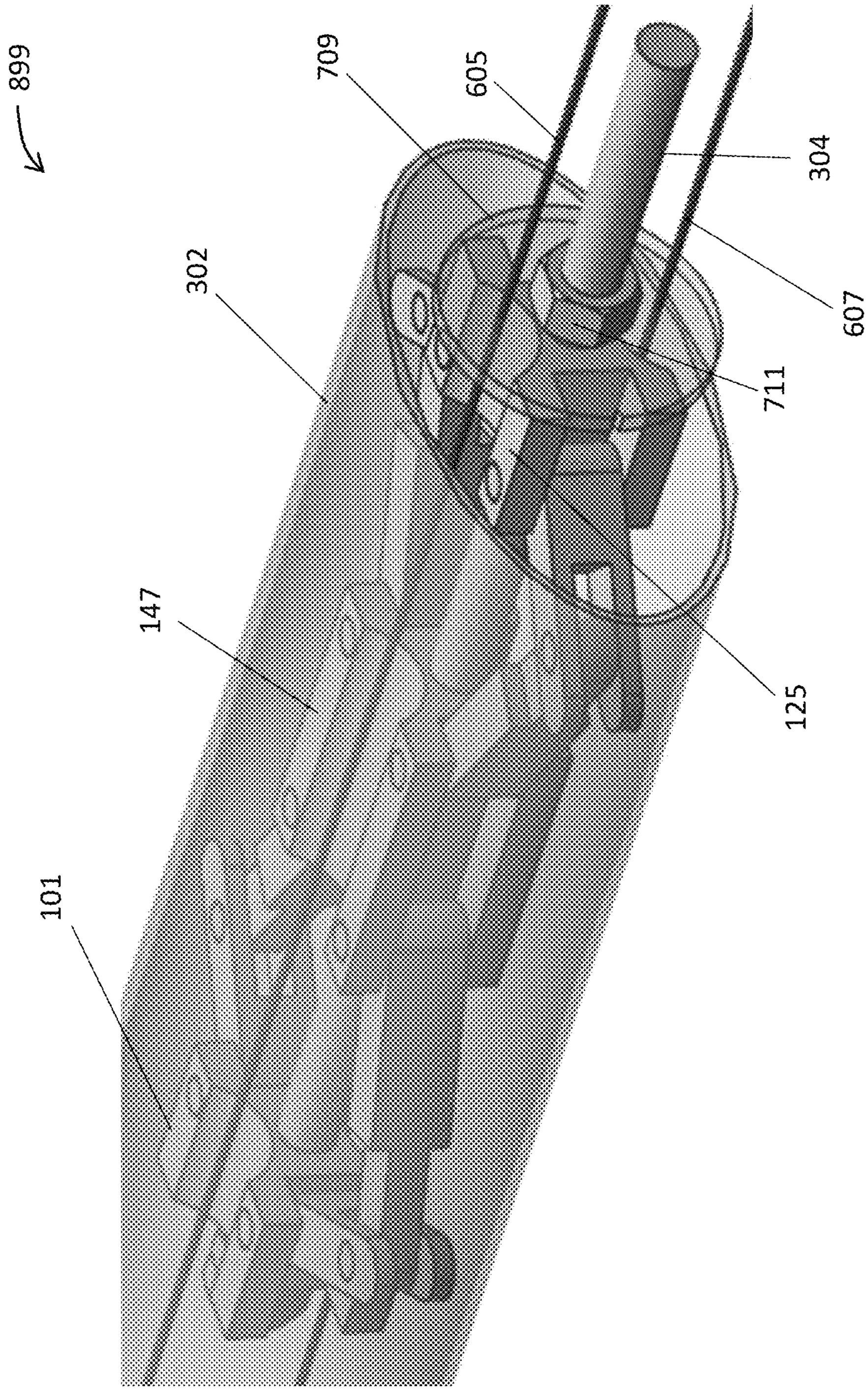
FIG. 8C is a perspective and partly sectional view of the centerline clamp of FIGS. 8A and 8B fixing in position a downstream polarizer positioned to receive the parallel beams of FIG. 7C for the axis-relative measurement of the elliptical pipe of FIG. 7C.

Referring now to FIGS. 7A, 7B, and 7C, and continuing to refer to FIGS. 1A, 1B, 3A, 3B, 4A, and 4B, an exemplary application 799 of the clamp 100 of the invention to a specialty device 700 for determining straightness or relative degree of twist in a pipe with the assistance of a system of laser beam generating sources and laser beam polarizers will now be discussed in detail. For example, and without limitation, FIGS. 7A, 7B, and 7C show an elliptically shaped tube 302 within which a type 100 clamp may be deployed having a modified linkage pin assembly 147. The modification optionally selected of pin assembly 147 as illustrated may comprise the fabrication of a linear tubular housing 601 within which may be seated a laser beam generating means 603, and a generated illustrated laser beam 605 projected through an upstream polarizer 609. The pin assembly 147 likewise may be modified, as in this example, to support a second housing (not shown, but similar to 601) on the assembly's opposed under side capable of generating a second laser beam 607 projected through the upstream polarizer 609. Laser beams 605 and 607 may be understood to be parallel in FIGS. 7A, 7B, and 7C and may be brought in axial alignment with the geometric axis of the tube 302 because the clamp 100 may be tightened within the tube 302 (note in FIGS. 7A, 7B and 7C the presence of tightening means including an actuation nut 611 and a jam nut 613). As illustrated in exemplary application 899, beams 605 and 607 may be beamed down the lumen of the tube 302 to a second clamp included in a complementary specialty device 800 at the other end of the tube 302 as shown in FIGS. 8A, 8B, and 8C (note in FIGS. 8A, 8B and 8C the presence of tightening means including an actuation nut 711 and a jam nut 713). There, the assemblies 101, 147, and 125 may be optionally modified to allow unblocked passage of beams 605 and 607 through to a downstream polarizer 709, which may orient the incipient beam in the X axis or Y axis, as desired. When the beams are turned on and polarized, the brightness of the beams downstream of the downstream polarizer 709 may be a function of the degree of twist in the pipe 302, and the offset detected in the beams may be a function of the offset in the degree of pipe 302 bend. It is to be understood that the laser beam generating means, the beams themselves, and the polarizers' perpendicular axes may be designed in this embodiment so as to be able to be brought into axial alignment with the geometric axis of the pipe 302.

Continuing to refer to FIGS. 7A, 7B, 7C, 8A, 8B, and 8C, in more detail, upstream polarizer 609 may be installed on the end of a modified first linkage assembly 101 and may be oriented in a known way relative to the linkage assembly 101 (for example, and without limitation, oriented 0 or 90 degrees relative to the linkage assembly 101 actuation plane and, thus, relative to the subject pipe's local ellipse cross section major axis). Both laser beams 605, 607 may pass through this upstream polarizer 609 and may be thus polarized at a known angle with respect to the pipe's local ellipse major axis. The beams 605, 607 may then traverse to the other end of the pipe (illustrated in FIGS. 7C and 8C), where the beams 605, 607 may hit the downstream polarizer 709. The downstream polarizer 701 may be oriented in a known way with respect to the linkage assembly 125 and, thus, with respect to the local major ellipse axis of the pipe (at the downstream end). For example, and without limitation, in the event both polarizers 609, 709 are set up to be at 0 degrees relative to their respective centerline clamps (i.e. parallel to a respective linkage assembly plane, or the ellipse major axis), if the pipe has no twist, the downstream polarizer 709 may do nothing to the incoming light (that is, beams 605, 607), as it was already polarized to that exact angle. If, however, the pipe does have twist, the downstream polarizer 709 may not be at the same angle as the polarization angle of the incoming light and, thus, the light will lose brightness after passing through downstream polarizer 709. By measuring this loss in brightness, the difference in angle between upstream polarizer 609 and downstream polarizer 709 may advantageously correspond to the twist angle in the pipe. Because this embodiment generally features light exiting the downstream polarizer 709, it may allow for checking of the laser beam offset to determine horizontal and vertical bend in the tube.

Continuing to refer to FIGS. 7C and 8C, an alternative embodiment may comprise orienting the polarizers 609, 709 such that, if the subject pipe has no twist angle, the polarizers 609, 709 may be 90 degrees apart (as opposed to the 0 degrees described above). In this alternative embodiment, no light may pass through the downstream polarizer 709 if the pipe is perfectly untwisted. If, however, the pipe has twist, the downstream polarizer 709 may allow some light to pass through. By measuring the brightness, calculating the angle offset of the polarizers 609, 709 may indicate the twist in the pipe. Although this embodiment may not always feature light exiting the downstream polarizer 709, it may be advantageously sensitive to small twist angles.

Figure 9:
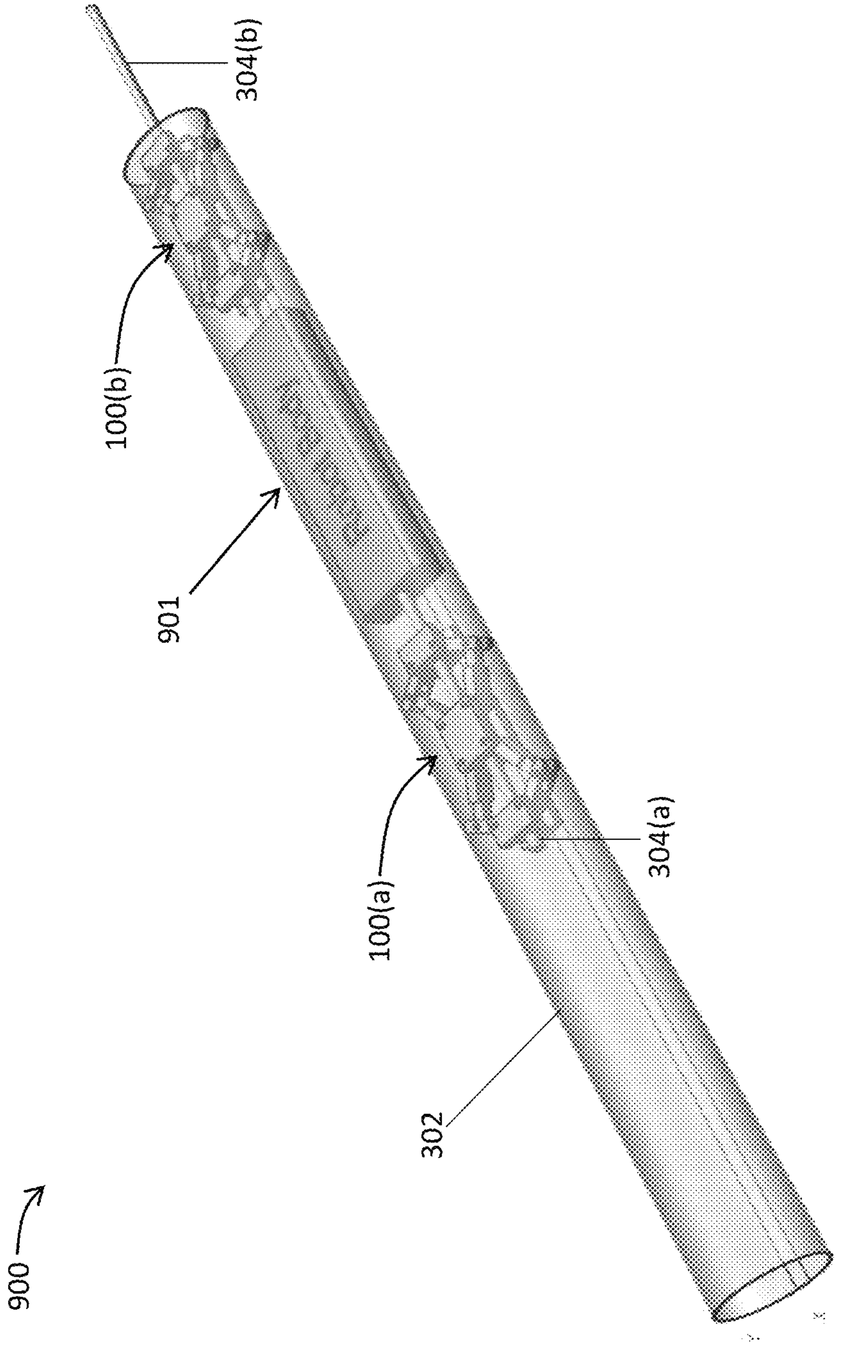
FIG. 9 is a perspective and partly sectional view of an exemplary assembly of centerline clamps and inserted centerline shafts configured for selective actuation by a robot to perform assembly locomotion in relation to a host pipe according to an embodiment of the present invention.

Referring now to FIG. 9, and continuing to refer to FIGS. 1A, 3A, 3B, 4A, and 4B, an exemplary robotic locomotion application 900 employing a combination of a pair of clamps 100(*a*), 100(*b*) and a robot means 901 configured to operate in combination to traverse the interior of a subject pipe 302 will now be discussed in detail. Similar to the alternative embodiments described above, all components may be maintained in axial alignment with shafts 304(*a*), 304(*b*), which may pass colinearly into the body of robot means 901, which itself is illustrated as being in axial alignment with the geometric axis of elliptical pipe 302. In practice, the robot means 901 may be a self-contained unit having signal receiving and transmitting capability (for example, and without limitation, radio wave), an energy source (for example, a rechargeable battery), and an electromechanical drive means capable of imparting motion to the shafts 304(*a*), 304(*b*) sufficient to cause either of clamps 100(*a*), 100(*b*) to alternatively tighten or loosen their respective grip on the interior of the pipe 302 in a desired pattern that may mimic an inchworm type of linear movement as one unit 100(*b*) may be clamped in place, providing an anchoring means for the second unclamped unit 100(*a*) to move axially to a desired location, then itself may be tightened in place, followed by the first unit 100(*b*) loosening, then traveling, and so on in a repeating cycle of selected speed, distance or duration. Robot means 901 may additionally comprise internally a logic unit, a memory unit, and a data storage unit. The ability of each of the clamps 100(*a*), 100(*b*) to tightly grip the interior of the pipe 302 may provide a sturdy basis of traction for the robot means 901 to pull or push a given load. On the basis of this principle, the robot 901 may drag lengths of tube or cable through a pipe 302, push a cleaning device through for internal cleaning operations, and/or it may push an internal forming die through the pipe 302 or tube to achieve a desired geometry or to repair dents or deformations.

Continuing to refer to FIG. 9 and to FIGS. 1A, 3A, 3B, 4A, and 4B, in more detail, assume the robot 901 is traveling from right to left in the subject pipe 302 as shown. Also assume that both centerline clamps 100(*a*) and 100(*b*) are oriented such that the "forward direction" (relative to robot motion) of each of these clamps is toward respective linkage assembly 111 and the "backward direction" (relative to robot motion) of each of these clamps is toward respective linkage assembly 101. In one embodiment, the "front" clamp 100(*a*) may be configured with jam nuts in front of "leading" linkage assembly 111 and a threaded "trailing" linkage assembly 101 (that is, bore 103 of linkage assembly 101 may be threaded). Optionally, a spring (not shown) may be included on the shaft 304(*a*) between trailing linkage assembly 101 and common linkage assembly 121 on the front clamp to make sure that the "leading" pair of linkages 119 actuates before the "trailing" pair of linkages 109). Rotating the leading shaft 304(*a*) may effectively tighten or loosen the leading clamp 100(*a*). The trailing clamp 100(*b*) may be actuated by a separate trailing shaft 304(*b*) that may be positioned collinear with the leading shaft 304(*a*) for the leading clamp 100(*a*). These independently operable shafts 304(*a*), 304(*b*) may both enter the inside of the robot 901 at opposing ends of the robot 901. As shown, the "back" clamp 100(*b*) may be configured with jam nuts behind "trailing" linkage assembly 101 and a threaded "leading" linkage assembly 111 (that is, bore 113 of linkage assembly 111 may be threaded). Rotating the trailing shaft 304(*b*) may effectively tighten or loosen the trailing clamp 100(*b*).

To achieve locomotion using the robot 901 and centerline clamps 100(*a*), 100(*b*) as described above, the robot 901 may be capable of thrusting either or both of the leading shaft 304(*a*) and the trailing shaft 304(*b*) forward or backward. For example, and without limitation, assume both clamps 100(*a*), 100(*b*) may be tightened to start a locomotion cycle. The robot 901 may rotate the leading shaft 304(*a*) to loosen the leading clamp 100(*a*), may thrust the leading shaft 304(*a*) forward, and then may rotate the leading shaft 304(*a*) the opposite way to tighten the leading clamp 100(*a*) (e.g., to engage the interior of the subject pipe 302). Then robot 901 may rotate the trailing shaft 304(*b*) to loosen the trailing clamp 100(*b*), may retrieve the leading shaft 304(*a*) backward (thus dragging the robot 901 body and trailing clamp 100(*b*) forward (i.e., to the left in FIG. 9). The robot 901 may then rotate the trailing shaft 304(*b*) to tighten the trailing clamp 100(*b*) (e.g., to engage the interior of the subject pipe 302) to complete one cycle of the inchworm style locomotion.

In certain embodiments, the robot 901 may include an inertial measurement unit (IMU) carried by the body of the robot 901 and comprising, for example, and without limitation, an accelerometer and/or a gyroscope. Such instrumentation may equip the robot 901 to ascertain its tilt, pitch, and/or yaw (as well as translational position changes). Reading these values as the robot 901 traverses the inside of a pipe may advantageously map the three-dimensional bend and twist of the pipe at all points along its length.

Employing the locomotion functionality described above, certain embodiments of the present invention may advantageously pull and/or push mounted accessories through a subject pipe, such as a cleaning device, a forming device or die (e.g., for flaring pipe), or an internal laser scanner (e.g., to map the interior surface of a pipe at all points and find dents or deformation). Alternative embodiments of the present invention may advantageously adorn the robot 901 with a small actuator on its body that may move to a given dent location and knock the dent out from inside the pipe. Additional alternative embodiments of the present invention may advantageously adorn the robot 901 with an accessory capable of welding the entire perimeter of a pipe from the inside, which may be an extremely useful capability for vacuum systems where internal welds are preferred. In such implementations, the robot 901 may internally move to a physical location inside of a pipe that presents a joint or weld location, may perform the weld, and then may move on to the next location of interest. In this manner, the present invention may advantageously be used to weld entire pipelines. Some of the illustrative aspects of the present invention may be advantageous in solving the problems herein described or yet to be addressed.

While the above description contains much specificity, these should not be construed as limitations on the scope of any embodiment, but as exemplifications of the presented embodiments thereof. Many other modifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are, unless otherwise stated, used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the following claims and their legal equivalents, and not limited by the examples given. While the invention has been described and illustrated with reference to certain fabricated embodiments thereof, those skilled in the art will appreciate that various changes, modifications and substitutions can be made therein without departing from the spirit and scope of the invention. It is intended, therefore, that the invention be limited only by the scope of the claims which follow, and that such claims be interpreted as broadly as possible.

What is claimed is:

1. A centerline clamp assembly for holding a pipe comprising:

a common linkage assembly positioned between a first linkage assembly and a second linkage assembly along a common axis, to define a centerline; and a plurality of linkages each comprising a plurality of toggle joints each comprising a respective first arm pivotally connected to a respective second arm to define a respective joint, wherein each of the respective joint is positioned on each of the respective first arm substantially longitudinally inward, with respect to the centerline, of a respective gripping appendage and a respective contact surface member of each of the respective first arm proximate a respective first arm proximal end with respect to the centerline, and is positioned on each of the respective second arm proximate a respective second arm proximal end with respect to the centerline;

wherein the common linkage assembly is pivotally connected to the respective second arm of the plurality of second arms of each of the plurality of linkages at a respective common arm hinge substantially opposite a respective joint of the respective second arm;

wherein the first linkage assembly is pivotally connected to a respective first arm of the plurality of first arms of each of a first subset of the plurality of linkages at a respective first linkage arm hinge substantially opposite a respective contact surface member of the respective first arm of each of the first subset of the plurality of linkages and is configured to actuate coaxially along the centerline to position the respective second arm of each of the first subset of the plurality of linkages at a first angle greater than 0 degrees and less then 90 degrees with respect to the centerline and to position the respective contact surface member of each of the first subset of the plurality of linkages oriented at a first inward holding angle toward the common linkage assembly with respect to a first plane perpendicular to the centerline; and wherein the second linkage assembly is pivotally connected to a respective first arm of the plurality of first arms of each of a second subset of the plurality of linkages at a respective second linkage arm hinge substantially opposite a respective contact surface member of the respective first arm of each of the second subset of the plurality of linkages and is configured to actuate coaxially along the centerline to position the respective second arm of each of the second subset of the plurality of linkages at a second angle greater than 0 degrees and at less than 90 degrees with respect to the centerline and to position the respective contact surface member of each of the second subset of the plurality of linkages oriented at a second inward holding angle toward the common linkage assembly with respect to a second plane perpendicular to the centerline, wherein the second inward holding angle substantially equally opposes the first inward holding angle with respect to the centerline exerting equal and opposite axial forces on interior walls of the pipe producing a self-holding effect during clamping; and wherein the respective contact surface member of the respective first arm of each of the first subset of the plurality of linkages and the respective contact surface member of the respective first arm of each of the second subset of the plurality of linkages have an equal and opposite range of motion.

2. The centerline clamp assembly according to claim 1, wherein the first linkage assembly is further configured to actuate along the centerline axis axially toward the common linkage assembly to radially increase the first angle with respect to the centerline.

3. The centerline clamp assembly according to claim 1, wherein the first linkage assembly is further configured to actuate along the centerline away from the common linkage assembly to radially decrease the first angle with respect to the centerline.

4. The centerline clamp assembly according to claim 1, wherein each of the common linkage assembly, the first linkage assembly, and the second linkage assembly further define respective bores aligned along the centerline.

5. The centerline clamp assembly according to claim 4 further comprising a shaft configured for threaded reception by the bore of the second linkage assembly.

6. The centerline clamp assembly according to claim 1 wherein the plurality of linkages further comprises at least one pair of the plurality of linkages positioned symmetrically opposed through respective ranges of motion with respect to the centerline.

7. The centerline clamp assembly according to claim 6 wherein the plurality of linkages are symmetrically opposed through respective ranges of motion along a single plane that includes the centerline.

8. The centerline clamp assembly according to claim 1 wherein at least one of the respective contact surface members of the plurality of toggle joints is substantially rounded.

9. A centerline clamp assembly for holding a pipe comprising:

a plurality of common linkage assemblies positioned between a first linkage assembly and a second linkage assembly along a common axis, to define a centerline; and a plurality of linkages each comprising a plurality of toggle joint each comprising a respective first arm pivotally connected to a respective second arm to define a respective joint, wherein each of the respective joint is positioned on each of the respective first arm substantially longitudinally inward, with respect to the centerline, of a respective gripping appendage and a respective contact surface member of each of the respective first arm proximate a respective first arm proximal end with respect to the centerline, and is positioned on each of the respective second arm proximate a respective second arm proximal end with respect to the centerline;

wherein the plurality of common linkage assemblies is pivotally connected in series by a central subset of the plurality of linkages;

wherein the first linkage assembly is pivotally connected to a respective first arm of the plurality of first arms of each of an inner subset of the plurality of linkages at a respective first linkage arm hinge substantially opposite a respective contact surface member of the respective first arm of each of the inner subset of the plurality of linkages and the first linkage assembly is configured to actuate coaxially along the centerline to position the respective first arm of each of the inner subset of the plurality of linkages at a first angle greater than 0 degrees and less than 90 degrees with respect to the centerline and to position the respective contact surface member of each of the inner subset of the plurality of linkages oriented at a first inward holding angle toward the plurality of common linkage assemblies with respect to a first plane perpendicular to the centerline; and wherein the second linkage assembly is pivotally connected to a respective first arm of the plurality of first arms of each of an outer subset of the plurality of linkages at a respective second linkage arm hinge substantially opposite the respective contact surface member of the respective first arm of each of the outer subset of the plurality of linkages and the second linkage assembly is configured to actuate coaxially along the centerline to position the respective first arm of each of the outer subset of the plurality of linkages at a second angle greater than 0 degrees and less than 90 degrees with respect to the centerline and to position the respective contact surface member of each of the outer subset of the plurality of linkages oriented at a second inward holding angle toward the plurality of common linkage assemblies with respect to a second plane perpendicular to the centerline, wherein the second inward holding angle substantially equally opposes the first inward holding angle with respect to the centerline exerting equal and opposite axial forces on interior walls of the pipe producing a self-holding effect during clamping; and wherein the respective contact surface member of each of the inner subset of the plurality of linkages and the respective contact surface member of the respective first arm of each of the outer subset of the plurality of linkages have an equal and opposite range of motion.

10. The centerline clamp assembly according to claim 9 wherein the first linkage assembly is further configured to actuate along the centerline axis toward the plurality of common linkage assemblies to radially increase the first angle with respect to the centerline.

11. The centerline clamp assembly as claimed in claim 9 wherein the first linkage assembly is further configured to actuate along the centerline axially away from the plurality of common linkage assemblies to radially decrease the first angle with respect to the centerline.

12. The centerline clamp assembly according to claim 9 wherein each of the plurality of common linkage assemblies, the first linkage assembly, and the second linkage assembly further comprises a respective bore positioned along the centerline.

13. The centerline clamp assembly according to claim 12 further comprising a shaft configured for threaded reception by the bore of the second linkage assembly, and configured to actuate at least one of the first linkage assembly and the second linkage assembly.

14. The centerline clamp assembly according to claim 9 wherein the plurality of linkages further comprises at least one pair of the plurality of linkages positioned symmetrically opposed through respective ranges of motion with respect to the centerline.

15. The centerline clamp assembly according to claim 14 wherein a first subset of the plurality of linkages are symmetrically opposed through respective ranges of motion along a first single plane that includes the centerline, and wherein a second subset of the plurality of linkages are symmetrically opposed through respective ranges of motion along a second single plane perpendicular to the first single plane.

16. The centerline clamp assembly according to claim 9 wherein at least one of the respective contact surface members of the plurality of toggle joints is substantially rounded.

17. A method of operating a centerline clamp assembly for holding a pipe comprising:

a common linkage assembly positioned between a first linkage assembly and a second linkage assembly along a common axis, to define a centerline; and a plurality of linkages each comprising a plurality of toggle joints each comprising a respective first arm pivotally connected to a respective second arm to define a respective joint, wherein each of the respective joint is positioned on each of the respective first arm substantially longitudinally inward, with respect to the centerline, of a respective gripping appendage and a respective contact surface member of each of the respective first arm proximate a respective first arm proximal end with respect to the centerline, and is positioned on each of the respective second arm proximate a respective second arm proximal end with respect to the centerline;

wherein the common linkage assembly is pivotally connected to a respective second arm of the plurality of second arms of each of the plurality of linkages at a respective common arm hinge substantially opposite a respective joint of the respective second arm;

wherein the first linkage assembly is pivotally connected to a respective first arm of the plurality of first arms of each of a first subset of the plurality of linkages at a respective first linkage arm hinge substantially opposite a respective contact surface member of the respective first arm of each of the first subset of the plurality of linkages; and wherein the second linkage assembly is pivotally connected to a respective first arm of the plurality of first arms of each of a second subset of the plurality of linkages at a respective second linkage arm hinge substantially opposite a respective contact surface member of the respective first arm of each of the second subset of the plurality of linkages;

the method comprising the steps of:

selectively actuating the first linkage assembly coaxially along the centerline to position the respective second arm of each of the first subset of the plurality of linkages at a first angle greater than 0 degrees and less than 90 degrees with respect to the centerline and to position the respective contact surface member of each of the first subset of the plurality of linkages oriented at a first inward holding angle toward the common linkage assembly with respect a first plane perpendicular to the centerline; and selectively actuating the second linkage assembly coaxially along the centerline to position the respective second arm of each of the second subset of the plurality of linkages at a second angle greater than 0 degrees and less than 90 degrees with respect to the centerline and to position the respective contact surface member of each of the second subset of the plurality of linkages oriented at a second inward holding angle toward the common linkage assembly with respect to a second plane perpendicular to the centerline, wherein the second inward holding angle substantially equally opposes the first inward holding angle with respect to the centerline exerting equal and opposite axial forces on interior walls of the pipe producing a self-holding effect during clamping; and wherein the respective contact surface member of the respective first arm of each of the first subset of the plurality of linkages and the respective contact surface member of the respective first arm of each of the second subset of the plurality of linkages have an equal and opposite range of motion.

18. The method according to claim 17 further comprising actuating the first linkage assembly along the centerline toward the common linkage assembly to radially increase the first angle with respect to the centerline.

19. The method according to claim 17 further comprising actuating the first linkage assembly coaxially along the centerline away from the common linkage assembly to radially decrease the first angle with respect to the centerline.

20. The method according to claim 17 wherein the centerline clamp assembly further comprises:

a respective bore defined in each of the common linkage assembly, the first linkage assembly, and the second linkage assembly and aligned along the centerline; and a shaft configured for threaded reception by the bore of the second linkage assembly;

the method further comprising the step of actuating the shaft inserted into the respective bores of each of the first and second linkage assemblies along the centerline to linearly actuate of the first linkage assembly and the second linkage assembly along the centerline.

* * * * *